United States Patent [19]
Azukizawa et al.

[11] Patent Number: 5,156,093
[45] Date of Patent: * Oct. 20, 1992

[54] TRANSPORTATION SYSTEM OF FLOATED-CARRIER TYPE

[75] Inventors: Teruo Azukizawa, Tokyo; Mimpei Morishita, Fuchu; Toyohiko Yokoyama, Urawa; Shigeo Takaki, Fuchu; Yoshio Yuyama, Tokyo; Akitaka Noda, Fuchu, all of Japan

[73] Assignee: Kabushiki Kaisha Toshiba, Kawasaki, Japan

[*] Notice: The portion of the term of this patent subsequent to Mar. 8, 2005 has been disclaimed.

[21] Appl. No.: 512,433

[22] Filed: Apr. 23, 1990

Related U.S. Application Data

[63] Continuation of Ser. No. 305,191, Feb. 2, 1989, Pat. No. 4,934,279, which is a continuation of Ser. No. 135,084, Dec. 18, 1987, Pat. No. 4,882,999.

[30] Foreign Application Priority Data

Dec. 19, 1986 [JP] Japan .................... 61-303442

[51] Int. Cl.⁵ .............................. B60L 13/06
[52] U.S. Cl. ................... 104/284; 104/282; 104/130.1
[58] Field of Search ............... 104/281, 282, 283, 284, 104/286, 123, 130, 130.1, 295, 300, 304, 138.1, 88, 292; 238/10 R, 10 A, 10 E, 14.05, 14.3; 246/415 R, 424, 426, 122 R, 182 R, 2 R, 3, 122 A

[56] References Cited

U.S. PATENT DOCUMENTS

| | | | |
|---|---|---|---|
| 3,570,177 | 3/1971 | Tomaro | 104/295 |
| 3,763,788 | 10/1973 | Pougue | 104/130.1 |
| 3,954,064 | 5/1976 | Minovitch | 104/130.1 |
| 4,678,981 | 7/1987 | Murray | 104/295 |
| 4,718,621 | 1/1988 | Horinouchi et al. | 246/122 R |
| 4,729,323 | 3/1988 | Morishita et al. | 104/284 |
| 4,732,087 | 3/1988 | Morishita et al. | 104/130.1 |
| 4,766,547 | 8/1988 | Modery et al. | 104/88 |
| 4,841,869 | 6/1989 | Takeuchi et al. | 104/292 |

FOREIGN PATENT DOCUMENTS

| | | | |
|---|---|---|---|
| 0179188 | 4/1986 | European Pat. Off. | 104/284 |
| 0246098 | 11/1987 | European Pat. Off. | 104/284 |
| 2939540 | 4/1981 | Fed. Rep. of Germany | 104/130 |
| 224807 | 10/1986 | Japan | 104/281 |
| 224808 | 10/1986 | Japan | 104/281 |
| 0943747 | 12/1963 | United Kingdom | 238/14.05 |

Primary Examiner—Douglas C. Butler
Assistant Examiner—Mark T. Le
Attorney, Agent, or Firm—Oblon, Spivak, McClelland, Maier & Neustadt

[57] ABSTRACT

In a transportation system of a floated-carrier type, a carrier is suspended from a guide rail, in a non-contact manner, and is proelled along the guide rail. The transportation system includes a plurality of track units, each having the ferromagnetic guide rail, an electrical wire, and a pair of connectors provided to both ends of the electrical wire. Each track unit comprises minimum and necessary elements required for traveling the carrier. When a connector of one track unit and that of the other track unit are connected, connection of electrical wires necessary for this system is completed. For this reason, an operation for mounting the electrical wires in the track can be omitted, and installation of the track can be facilitated. Furthermore, when the travel path of the carrier is to be modified, a combination of track units can be freely changed, thus realizing various travel paths of the carriers. For this reason, the travel path can be easily modified.

9 Claims, 18 Drawing Sheets

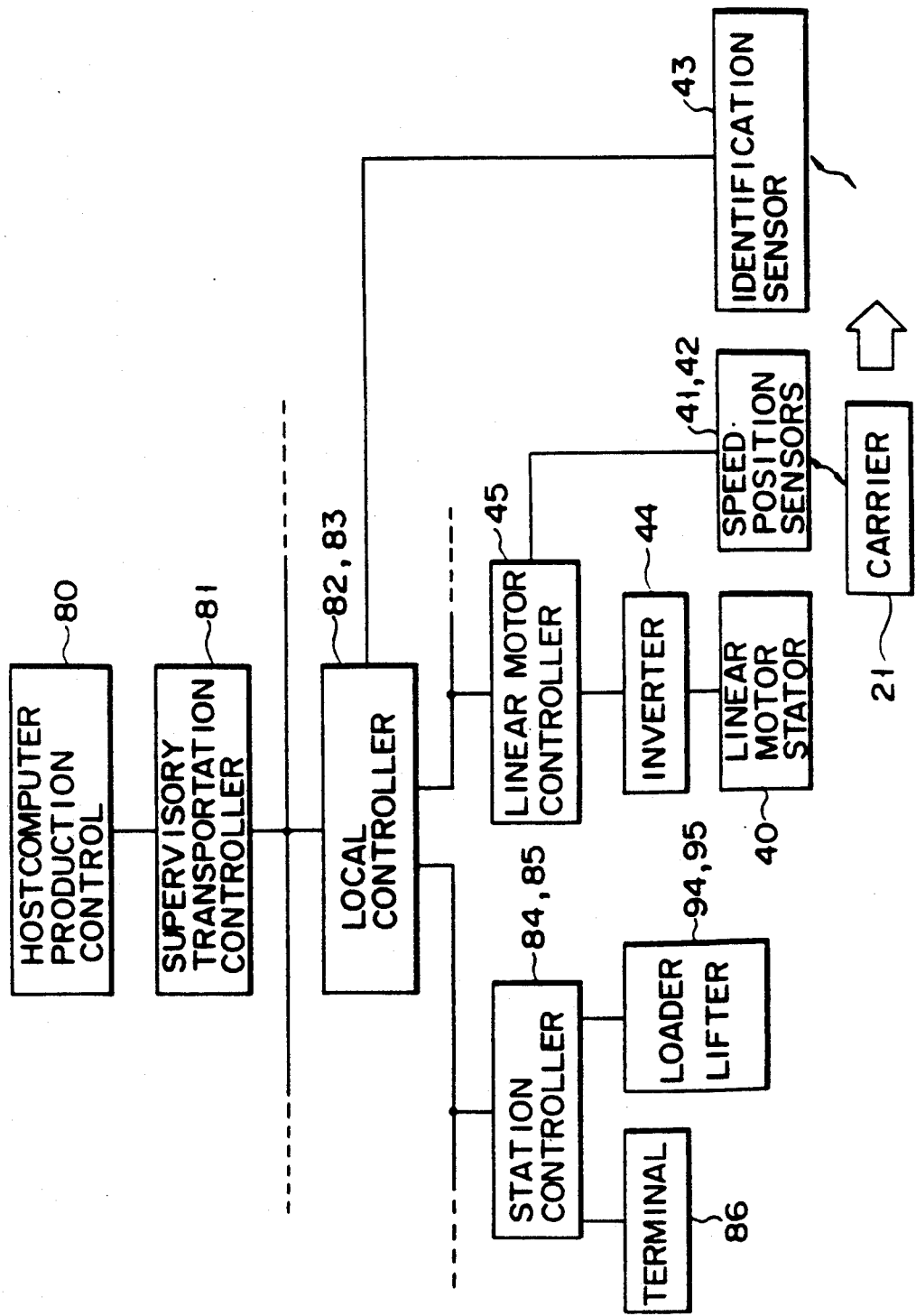
F I G. 5

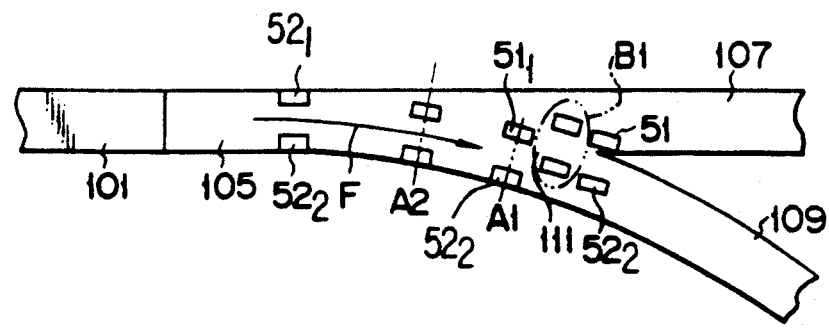
F I G. 7
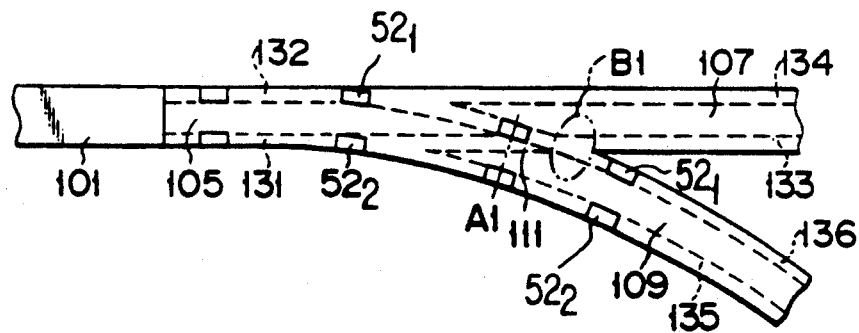
F I G. 8

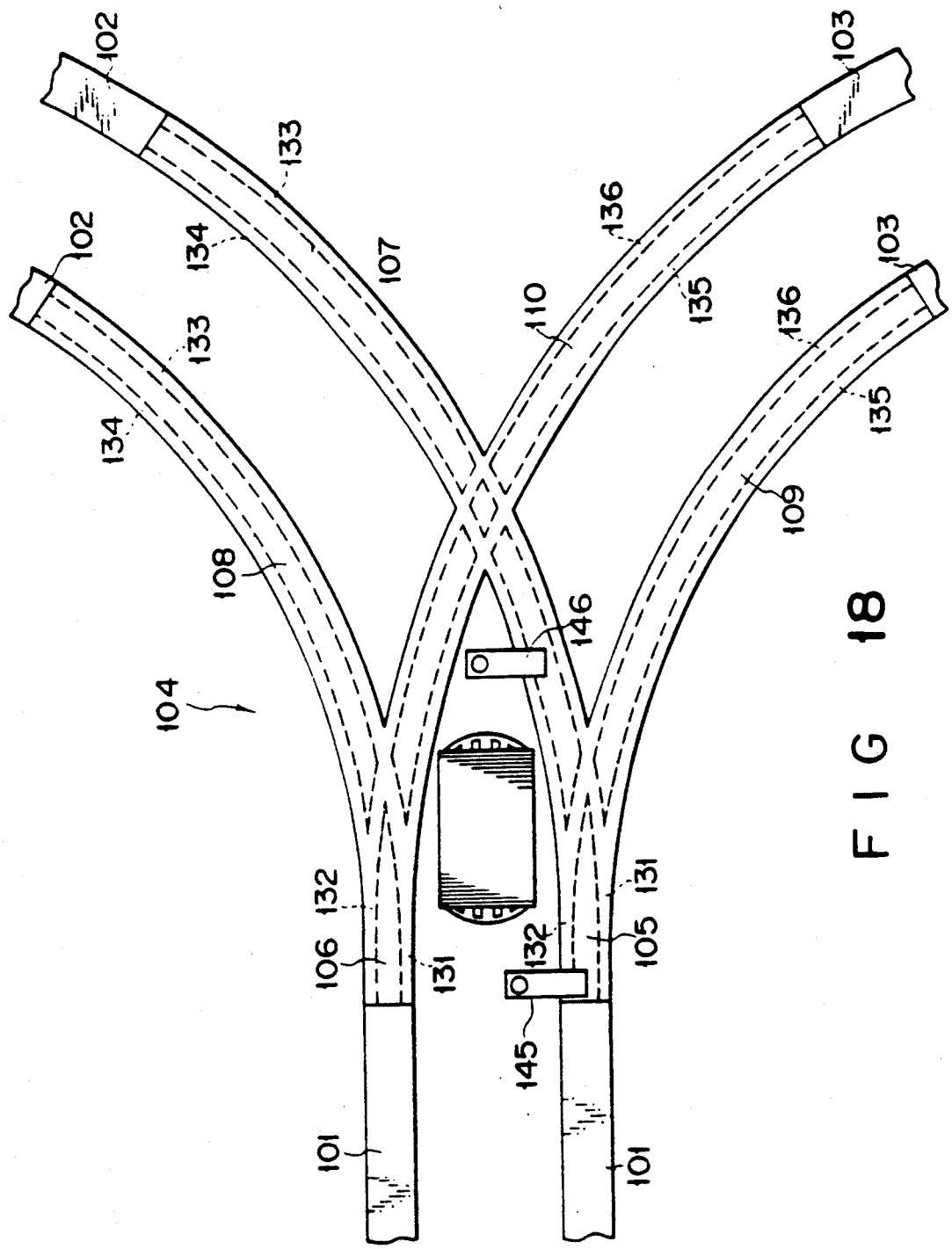

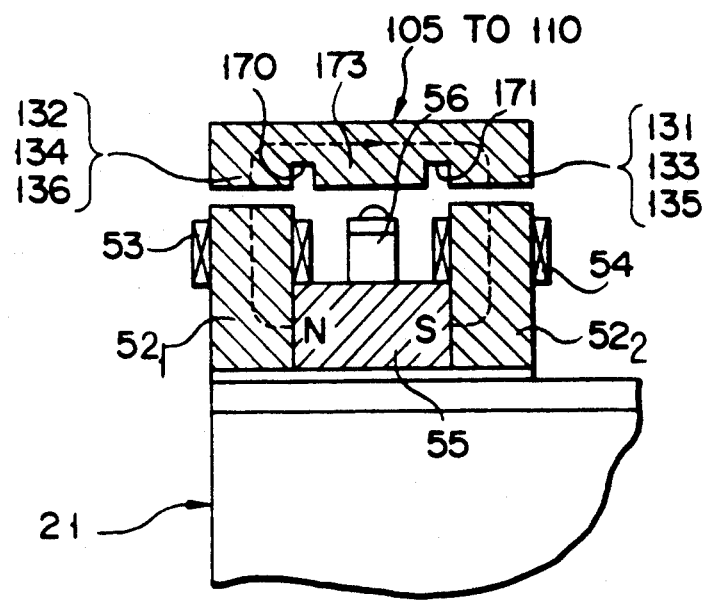
F I G. 20

TRANSPORTATION SYSTEM OF FLOATED-CARRIER TYPE

This application is a continuation of U.S. application Ser. No. 07/305,191 filed Feb. 2, 1989, now U.S. Pat. No. 4,934,279, which is a continuation of application Ser. No. 07/135,084 filed Dec. 18, 1987, now U.S. Pat. No. 4,882,999.

BACKGROUND OF THE INVENTION

The present invention relates to a transportation system of a floated-carrier type, and more particularly, to a transportation system, in which a carrier is suspended from a guide rail, in a non-contact manner, and is propelled along the guide rail.

To increase office or factory automation, transportation systems have recently been installed in some buildings. Such systems are used to transport slips, documents, cash, samples, or the like, between a plurality of locations in the buildings.

In order to avoid spoiling the environment of the offices or factories, transportation systems of this type are expected not to produce dust or high levels of noise. Thus, in U.S. Pat. Appl. No. 726,975, now abandoned, filed previously by the inventors hereof, a carrier is kept suspending from a guide rail, in a non-contact manner, by means of an electromagnetic attractive force acting between the carrier and the guide rail, when the carrier is propelled along the guide rail.

In this transportation system, a track supporting a guide rail is installed in correspondence with a path along which the carrier travels, in a factory. A stator for linear induction motors for propelling the carrier are arranged on the track at predetermined intervals. The stator is provided with an inverter which energizes the stator according to travel instruction supplied from a controller (described later). A reaction plate for linear induction motor is mounted on the carrier. Thus, the carrier is received accelerating or decelerating force from the stator, in such a manner that the carrier travels along the guide rail of the track. Various sensors are provided at predetermined positions of the track. Various controllers for controlling the traveling of the carrier based on signals from the sensors are provided to this system. Therefore, the sensors detect a current traveling position of the carrier, a traveling speed of the carrier, the type of carrier, and the like. These detection signals are supplied to the controllers and processed thereby. Carrier travel instructions are supplied from the controllers to the inverter provided on the stator, thereby controlling the traveling of the carrier.

In order to connect the various sensors and the various controllers, a number of signal wires through which electrical signals propagate are necessary. In addition, power wires for supplying power to the stator for the linear induction motors are also necessary. These signal wires and power wires are disposed along the track. A cumbersome operation is required to mount these signal wires and power wires on the track after the track is installed in the factory.

Furthermore, when a travel path of the carrier is changed, not only an old track is removed and a new track is installed but also the signal and power wires must be again mounted on the new track. For this reason, in order to change the travel path of the carrier, a cumbersome operation is required. Therefore, the travel path of the carrier cannot be easily changed.

SUMMARY OF THE INVENTION

It is an object of the present invention to provide a transportation system of a floated-carrier type which is free from a mounting operation of electrical wires in a track, can easily change a travel path of a carrier, and hence, can facilitate installation of a track.

According to the present invention, there is provided a transportation system of a floated-carrier type for transporting a cargo between predetermined positions, comprising:

a plurality of track units which are assembled each other, each of the track units including a guide rail formed of a ferromagnetic material and extending longitudinally by a predetermined length, support means for supporting the guide rail, an electrical wire extending longitudinally by a predetermined length, and a pair of connectors provided to both ends of the electrical wire;

a carrier for carrying the cargo, the carrier including a magnetic unit for suspending the carrier from the guide rail in a non-contact manner, the magnetic unit including an electromagnet arranged to have an air gap with respect to the guide rail, and a permanent magnet magnetically coupled to the electromagnet, the guide rail, the air gap, the electromagnet, and the permanent magnet defining a magnetic circuit, the permanent magnet providing magnetic energy, with which the carrier can be kept suspending against the weight thereof and the load thereon, the electromagnet adapted to be excited so as to maintain the gap clearance, at which the magnetic attractive force acting between the permanent magnet and the guide rail balances with the total weight of the carrier itself and the load, regardless of weight of the load; and propelling means for providing a propelling force to the carrier so as to cause the carrier to travel along the guide rail.

Therefore, each track unit comprises minimum and necessary elements required for traveling the carrier. When a connector of one track unit and that of the other track unit are connected, connection of electrical wires necessary for this system is completed. For this reason, an operation for mounting the electrical wires in the track can be omitted, and installation of the track can be facilitated.

Furthermore, when the travel path of the carrier is to be modified, a combination of track units can be freely changed, thus realizing various travel paths of the carrier. For this reason, the travel path can be easily modified.

BRIEF DESCRIPTION OF THE DRAWINGS

FIG. 5 is a view showing an arrangement of a control apparatus of the transportation system shown in FIG. 1;

FIG. 7 is a plan view of a flat coupling rail provided to the fifth track unit or curved branch unit;

FIG. 8 is a plan view of a coupling rail having a ridge, which is provided to the curved branch unit;

FIGS. 12 and 13 are sectional views taken along a line XII—XII in FIG. 11, in which FIG. 12 shows a case wherein the carrier is transferred from a first rail to a second rail, and FIG. 13 shows a case wherein the carrier is transferred from the first rail to a third rail;

FIGS. 14 to 16 are plan views of the curved branch unit, in which FIG. 14 shows a case wherein the carrier enters the first coupling rail, FIG. 15 shows a case wherein the carrier is transferred onto a third coupling rail, and FIG. 16 shows a case wherein the carrier is transferred onto a second coupling rail;

FIG. 18 is a plan view of a curved branch unit according to a first modification;

FIG. 20 is a sectional view of the coupling rail and the magnetic unit according to a third modification.

DETAILED DESCRIPTION OF THE PREFERRED EMBODIMENTS

Figure 1:
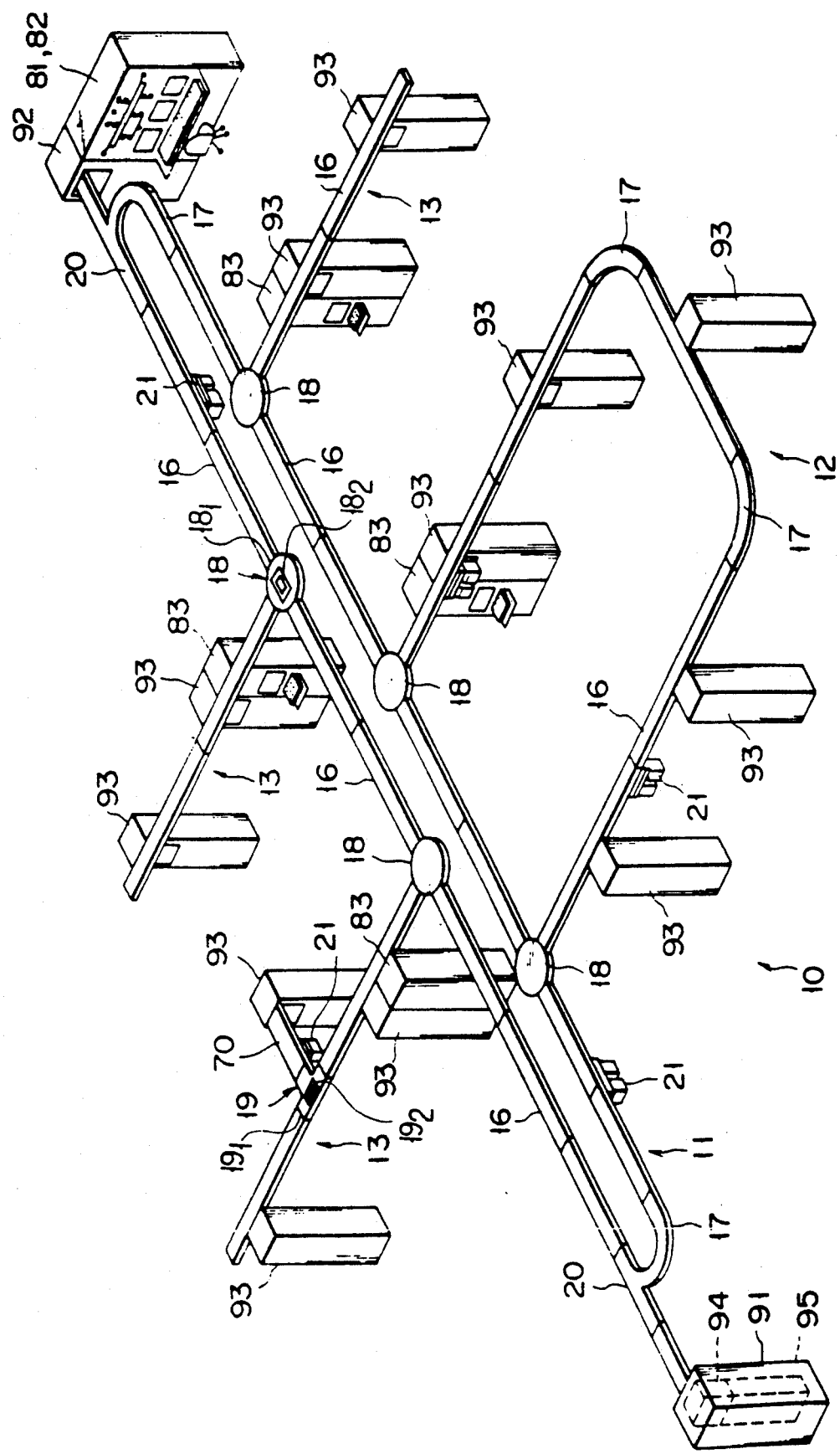
FIG. 1 is a perspective view of a transportation system according to the present invention.

FIG. 1 shows track assembly 10 of a transportation system of a floated-carrier type according to the present invention. In this transportation system, carrier 21 is suspended from track assembly 10 in a non-contact manner, and is propelled along the track assembly.

As shown in FIG. 1, track assembly 10 is constituted by annular main line 11, U-shaped branch line 12 extending transversally from main line 11, and linear branch line 13 extending transversally from main line 11. Main line 11 is connected to first station 91 for loading a cargo transported from a warehouse or the like or unloading the cargo from carrier 21 and transporting the cargo to the warehouse or the like. Main line 11 is also connected to second station 92 for maintaining and inspecting carrier 11. Third station 93 for unloading or loading a cargo from or onto carrier 21 is provided beside branch lines 12 and 13. Each of stations 91 to 93 comprises loader 94 for loading a cargo onto carrier 21 and lifter 95 for lifting the cargo between loader 94 and a predetermined position. (These stations are described in INTERNATIONAL CONFERENCE ON MAGLEV AND LINER DRIVES. May, 1987.)

Track assembly 10 is constituted by selectively combining a plurality of track units. In this transportation system, five types of track units are combined. First track unit 16 is a straight track unit for propelling carrier 21 along a straight track. Second track unit 17 is a curved track unit for propelling carrier 21 along a curved track. Third track unit 18 is a rotary branch unit in which two tracks are perpendicularly branched. Unit 18 includes a coupling section $18_1$, and a transfer unit $18_2$, of the tape as disclosed in more detail in U.S. Pat. No. 4,732,087, and is used for rotating carrier 21 so as to guide it from one track to the other track. Fourth track unit 19 is an orthogonal branch unit in which two tracks are perpendicularly branched and which is used for guiding carrier 21 from one track to the other track without rotating carrier 21 as shown in more detail in U.S. Pat. No. 4,729,323. Unit 19 likewise thus includes a coupling section 19, and a transfer unit $19_2$. Fifth track unit 20 is a curved branch unit in which a curved track is branched from a straight track.

First track unit or straight track unit 16 will be described with reference to FIGS. 2 and 3.

First track unit 16 comprises a pair of support members 31 each of which is formed of a non-ferromagnetic material, extends longitudinally by a predetermined length, and has an E-shaped section. Each support member 31 has vertical base member 32. Upper flange 33, middle flange 34, and lower flange 35 extend from each base member 32. A pair of guide rails 36 are mounted on lower surfaces of middle flanges 34. Each guide rail 36 is formed of a ferromagnetic material, and extends longitudinally by a predetermined length. The pair of support members 31 are coupled by a plurality of coupling members 37.

Stator 40 for a linear induction motor constituting propelling means is provided to first track unit 16. Stator 40 is supported on the lower surfaces of two coupling members 37. Stator 40 is arranged to face reaction plate 58 (to be described later).

First or position sensor 41 for detecting if carrier 21 passes a predetermined position, and second or speed sensor 42 for detecting a speed when carrier 21 passes the predetermined position, are mounted on the side surface of one base member 32. Third or identification sensor 43 for identifying the type of carrier 21 is mounted on the side surface of the other base member 32. Inverter 44 and linear motor controller 45 are mounted on the upper surface of one end coupling member 37. Inverter 44 supplies three-phase AC power to stator 40. Linear motor controller 45 controls the three-phase AC power supplied from inverter 44 to stator 40 in accordance with detection signals from first and second sensors 41 and 42. Thus, carrier 21 is accelerated, decelerated, or stopped.

Furthermore, in track unit 16, electrical wire 46 is mounted on the side surface of each base member 32. Electrical wire 46 includes a power wire, connected to, e.g., inverter 44 and stator 40, for supplying power thereto, and a signal wire connected to first to third sensors 41 to 43, inverter 44, and linear motor controller 45, for transmitting electrical signals. A pair of connectors 47 are provided to both ends of electrical wire 46. Thus, when a plurality of track units are assembled, a connector of one track unit and that of the other track unit are connected to each other to complete connection of electrical wires necessary for this system. For this reason, a mounting operation of electrical wires in the track can be omitted. Of course, upon connection of the connectors, each electrical wire 46 is connected to an electrical power source (not shown) or local controllers 82 and 83 and supervisory transportation controller 81 (to be described later).

Carrier 21 will be described hereinafter.

Figure 4:
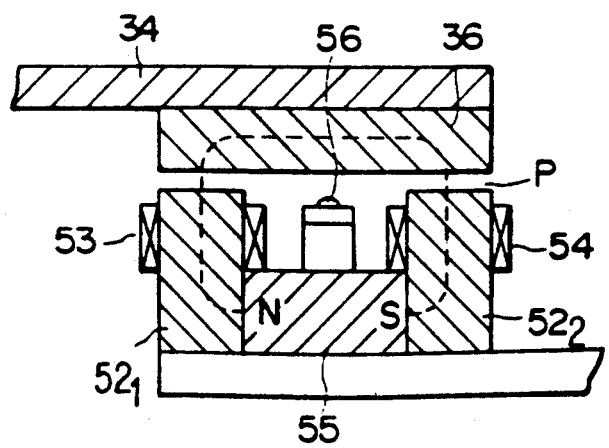
FIG. 4 is a sectional view of a magnetic unit for floating a carrier from a guide rail in a non-contact manner.

Carrier 21 comprises flat supporting plate 51 which is located below guide rail 36. Four magnetic units 50 are arranged at four corners of supporting plate 51. Magnetic units 50 cause carrier 21 to float from guide rails 36 in a non-contact manner. As is shown in FIG. 4, magnetic units 50 are each provided with yokes 52, and $52_2$, facing guide rail 36. Conducting wires are wound around yokes 52 and $52_2$, thus forming coils 53 and 54. Air gap P is defined between the top face of each yoke and the lower surface of rail 36. Permanent magnet 55 is used to couple yokes 52 and 52₂ magnetically. Thus, magnet 55, yokes 51 and 52, gap P, and rail 36 constitute a magnetic circuit. Each magnetic unit is further provided with gap sensor 56 for detecting the clearance of gap P.

Carrier 21 is suspended floating from guide rails 36, in a non-contact manner, by means of a magnetic attractive force acting between magnetic units 50 and guide rail 36. In this embodiment, units 50 are controlled by zero-power control device, so that the minimum necessary circuit current is supplied to coils 53 and 54 when carrier 21 is made to float. In other words, four permanent magnets 55 always generate an attractive force equal to the total weight of carrier 21 itself and the load. At the same time, coils 53 and 54 are excited, so as to maintain the air gap clearance at which the attractive force between permanent magnets 55 and rail 36 balances with the total weight of the carrier itself and the load. Coils 53 and 54 serve to subordinately cause carrier 21 to float. If the total weight of carrier 21 is changed by the load, the current fed to coils 53 and 54 is controlled so that gap P is adjusted to a distance such that the total attractive force between permanent magnets 55 and guide rails 36 balances the total weight of carrier 21 and the load. In other words, by controlling the current fed to the coils, clearance of gap P is adjusted to a value such that carrier 21 is caused to float by means of the magnetic energy of permanent magnet 55 only, despite the existence of disturbances. (The zero-power control device is described in detail in U.S. Pat. Appl. No. 726,975, filed previously by the inventors hereof).

According to the zero-power control, power required for keeping the carrier in a floating state can be reduced. For this reason, a battery mounted on the carrier need not be frequently charged, and the carrier can be continuously propelled over a long period of time. Control box 57 storing the battery 200 and the zero-power control device is mounted on the upper surface of supporting plate 51. As shown schematically in FIG. 2 and omitted for the sake of clarity from the other views, a charging power source 201 as described in U.S. Pat. No. 4,817,533 is also provided, and connected to a stationary charging terminal 202. The battery 200 is connected to a terminal 203. During operation, the carrier is stopped with the terminal 202 in electrical engagement with the terminal 203, and charging of the battery 200 by the charging power source 201 take place via the terminals 202, 203.

Reaction plate 58 constituting a propelling means is mounted at the center of the upper surface of supporting plate 51. Reaction plate 58 faces stator 40. If stator 40 is supplied with current, a traveling magnetic field is generated in stator 40, so that the current is induced to reaction plate 58. Through an interaction between the traveling field and the induced current, reaction plate 58 is subjected to thrust from stator 40, and a propelling force along the guide rail is applied to the carrier.

Figure 2:
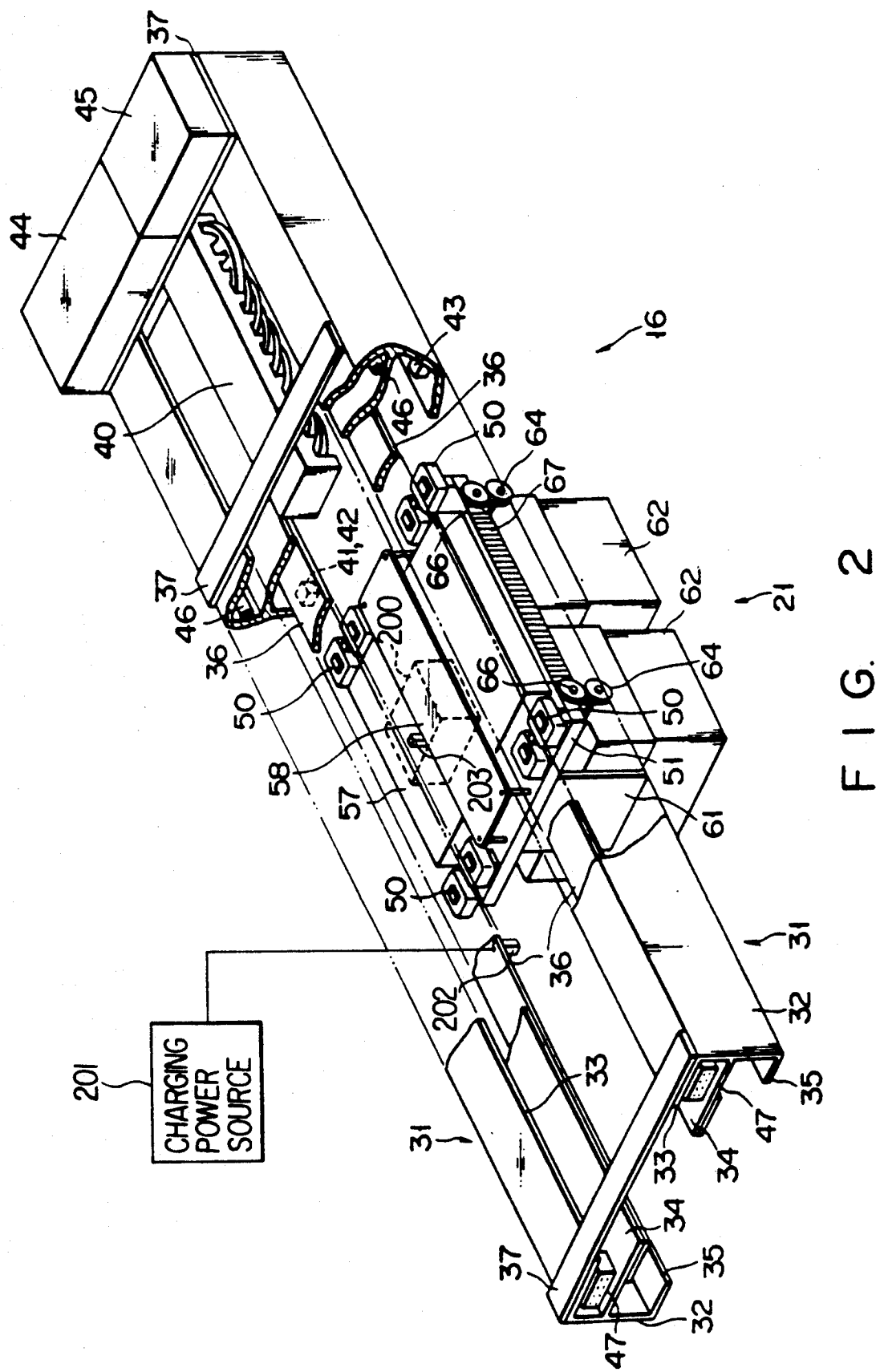
FIG. 2 is a perspective view of a first track unit assembled in the transportation system shown in FIG. 1.
Figure 3:
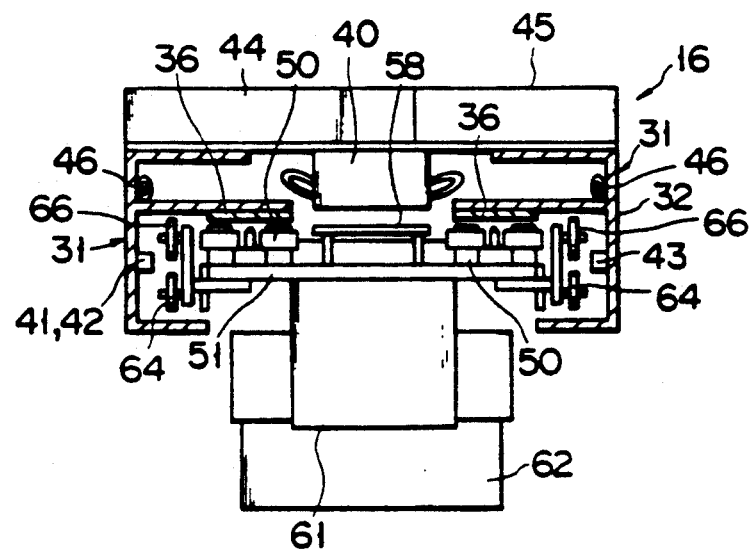
FIG. 3 is a sectional view of the first track unit shown in FIG. 2.

As shown in FIGS. 2 and 3, hook 61 extends downward from the side edge of supporting plate 51. Carrier box 62 for storing a cargo is mounted on the distal end portion of hook 61. Wheels 64 are provided to the side edges of supporting plate 51. Wheels 64 are in contact with upper surfaces of corresponding lower flanges 35 of support members 31 when magnetic units 50 do not generate a magnetic attraction force. Wheels 66 are also provided above wheels 64. Wheels 66 are in contact with the lower surfaces of middle flanges 34 of support members 31 when carrier 21 is lifted to its uppermost position. Bar code 67 is provided to the side surface of carrier 21. Bar code 67 is located to face first to third sensors 41 to 43. First to third sensors 41 to 43 read bar code 57, so as to detect if the carrier passes the predetermined position, a speed when the carrier passes the predetermined position, and the type of carrier.

Second track unit or curved track unit 17 is substantially the same as first track unit 16 except that its track is curved.

Third track unit or rotary branch unit 18 comprises a coupling section for coupling the guide rail of main line 11 and guide rails of branch lines 12 and 13. The coupling section is provided with a transfer means for guiding the carrier from main line 11 to branch line 12. Therefore, when carrier 21 receives an instruction for transferring the carrier from the main line to the branch line, the carrier, having so far been running along the main line, is stopped at the coupling section, then rotated, then stopped from rotating when the carrier faces the branch line, and then transferred from the coupling section to the second rail section, all in a non-contact manner. (This third track unit is disclosed in detail in U.S. Pat. Appl. No. 07/031,284 filed previously by the inventor hereof, now U.S. Pat. No. 4,732,087.)

Fourth track unit or orthogonal branch unit 19 comprises the coupling section and the transfer means as in the third track unit. For this reason, when carrier 21 receives an instruction for transferring the carrier from branch line 13 to branch line 70, the carrier, having so far been running along branch line 13, is stopped at the coupling section, and is then transferred from the coupling section to the branch line 70, all in a non-contact manner. Unlike third track unit 18, in fourth track unit 19, the carrier is not rotated when it is stopped at the coupling section. For this reason, on branch line 70, carrier 21 travels in a transverse direction thereof. Third station 93 is connected to branch line 70 extending from fourth track unit 19. When carrier 21 is stopped on branch line 70, third station 93 loads/unloads a cargo onto/from carrier 21. In this case, the subsequent carrier can pass by the stopping carrier. Thus, a travel time of the carrier can be shortened, and a transportation time of the cargo in this transportation system can be shortened.

Fourth track unit 19 may be mounted on main line 11. In this case, the carrier temporarily stands by on the branch line extending from fourth track unit 19. Thus, a large number of carriers on the main line can smoothly travel without causing traffic jam. (The fourth track unit is disclosed in detail in U.S. Pat. Appl. No. 07/030,750 filed previously by the inventor hereof, now U.S. Pat. No. 4,729,323.)

Fifth track unit or curved branch unit 20 will be described later in detail.

When these track units 16 to 20 are appropriately combined, main line 11 and branch line 12 are constituted. Each track unit comprises elements necessary for traveling the carrier. When a connector of one track unit is connected to a connector of the other track unit, connection of electrical wires necessary for this system can be completed. For this reason, a mounting operation of electrical wires in the track can be omitted, thus facilitating installation of the track.

Furthermore, when the travel path of the carrier is modified, a combination of track units are freely changed, so that various travel paths of the carrier can be realized. Thus, the travel path can be easily modified.

Furthermore, when one track unit is malfunctioned, the track unit can be replaced with a new one. For this reason, maintenance and inspection of the system can be facilitated.

A charging power source for charging the battery mounted on carrier 21 is provided to this system. Carrier 21 comprises a first terminal connected to the battery. For example, branch line 70 is provided with a second terminal connected to the charging power source. When the carrier is stopped at branch line 70, the first and second terminals are brought into contact with each other, and the charging power source supplies power to the battery via the first and second terminals. Since the battery is charged while the cargo is loaded/unloaded onto/from the carrier, the loading-/unloading time can be effectively utilized. (The charging power source is disclosed in detail in U.S. Pat. Appl. No. 07/046,464 filed previously by the inventors hereof, now U.S. Pat. No. 4,817,533.)

In order to control travel of the carrier, supervisory transportation controller 81 and a plurality of local controllers 82 and 83 are provided to this transportation system, as shown in FIG. 5. Supervisory transportation controller 81 is connected to host computer for production control 80. Host computer 80 manages production control for the entire plant, and creates instruction regarding transportation jobs for supervisory transportation controller 81. Supervisory transportation controller 81 manages and monitors the overall transportation system and distributes carriers 21 in an optimum timing and sequence to perform the transportation job instructed by a host computer. Local controller 82 performs traffic control of the carriers traveling along main line 11, and supplies an instruction for controlling first station 91 to station controller 84. Local controller 83 performs traffic control of the carriers traveling along branch lines 12 and 13, and supplies an instruction for controlling third station 93 to station controller 85. Station controllers 84 and 85 control loader 94 and lifter 95. Each station is provided with terminal 86. An operator can operate terminal 86 to create the transportation job. The speed and position of the carrier are detected by speed sensor 41 and position sensor 42, and the detection signals are supplied to linear motor controller 45. Identification sensor 43 identifies the type of carrier, and the detection signal is supplied to local controller 83. When the electrical power source is malfunctioned, an auxiliary electrical power source is provided to the system so that power is kept supplied to the transportation system without cutting off power supply to the transportation system.

As described above, in the transportation system, the carrier travels while being suspended from the guide rails in a non-contact manner. For this reason, during traveling of the carrier, neither noise, vibration, nor dust are generated. The carrier and the guide rails are not in mechanical contact with each other. When the carrier begins to travel and is stopped, no impact force is applied to the carrier. Thus, the cargo receives no impact force. Furthermore, the carrier propelled by the linear motor while being suspended from the guide rails in a non-contact manner. For this reason, the carrier can be accelerated and decelerated immediately.

Fifth track unit or curved branch unit 20 will be described in detail.

The necessity of the branch unit will be explained first. In this transportation system, a large number of carriers must travel among various locations in a factory within a short period of time. For this purpose, a large number of carriers which travel along a track must be subjected to traffic control. In order to facilitate the traffic control, as shown in FIG. 1, the track preferably has a main line coupling principal points, and a large number of branch lines branching from the main line and coupled to subpoints. For this reason, a large number of branch units for transferring the carrier from the main line to the branch line and vice versa are necessary. That is, if a large number of branch units are not provided to the track, a large number of carriers cause traffic jam, and traffic control may become impossible. Prior art examples of the branch unit are disclosed in the following publications:

U.S. Pat. No. 4,109,508 describes a transportation system, which is provided with a rail-switching device at a diverging section, where branch lines diverge from main lines. When the switching device is operated mechanically, the main lines are disconnected from one another, and are connected to branch lines, so that a carrier can be transferred from the main lines to the branch lines.

In a system described in Japanese Patent Disclosure No. 50-150112, no rail switching device is provided, and main and branch lines are connected directly at a diverging section. A guide plate is provided at the diverging section, whereby the rollers of a carrier are guided from the diverging section to the branch lines. As the rollers slide along the guide plate, the carrier is transferred from the main lines to the branch lines.

As has been described above, however, the branch unit for transferring the carrier, from the main lines to the branch lines, requires a mechanical switching device. Therefore, the branch unit is increased in size, thereby reducing the available space in the factory. Moreover, the switching device is operated mechanically, and especially in the system stated in Japanese Patent Disclosure No. 50-150112, the rollers of the carrier are in contact with the guide plate while the carrier is being transferred. As a result, noise is produced by the transfer apparatus.

Thus, such a transfer apparatus is liable to spoil the environment of the factory, in which case the main lines should not be provided with a large number of branch units. In this case, therefore, the carrier cannot run smoothly along the guide rail, and can reach its destination only after a long period of time.

The present inventors thus proposed third track unit or rotary branch unit 18 and fourth track unit or orthogonal branch unit 19 described above. In these branch units, a carrier is not in contact with the guide rails, and is transferred from one line to another line without producing noise. In addition, the size of the branch unit can be reduced. However, in these branch units, a carrier is temporarily stopped at the branch unit, and thereafter, is transferred from one line to another line. For this reason, a relatively long period of time is required in order to transfer the carrier from one line to another line. Thus, the carrier can reach its destination only after a long period of time.

The present inventors proposed fifth track unit or curved branch unit 20 in which a carrier is transferred from one line to another line without being stopped at the branch unit.

The arrangement of fifth track unit or curved branch unit 20 will be described.

Figure 6:
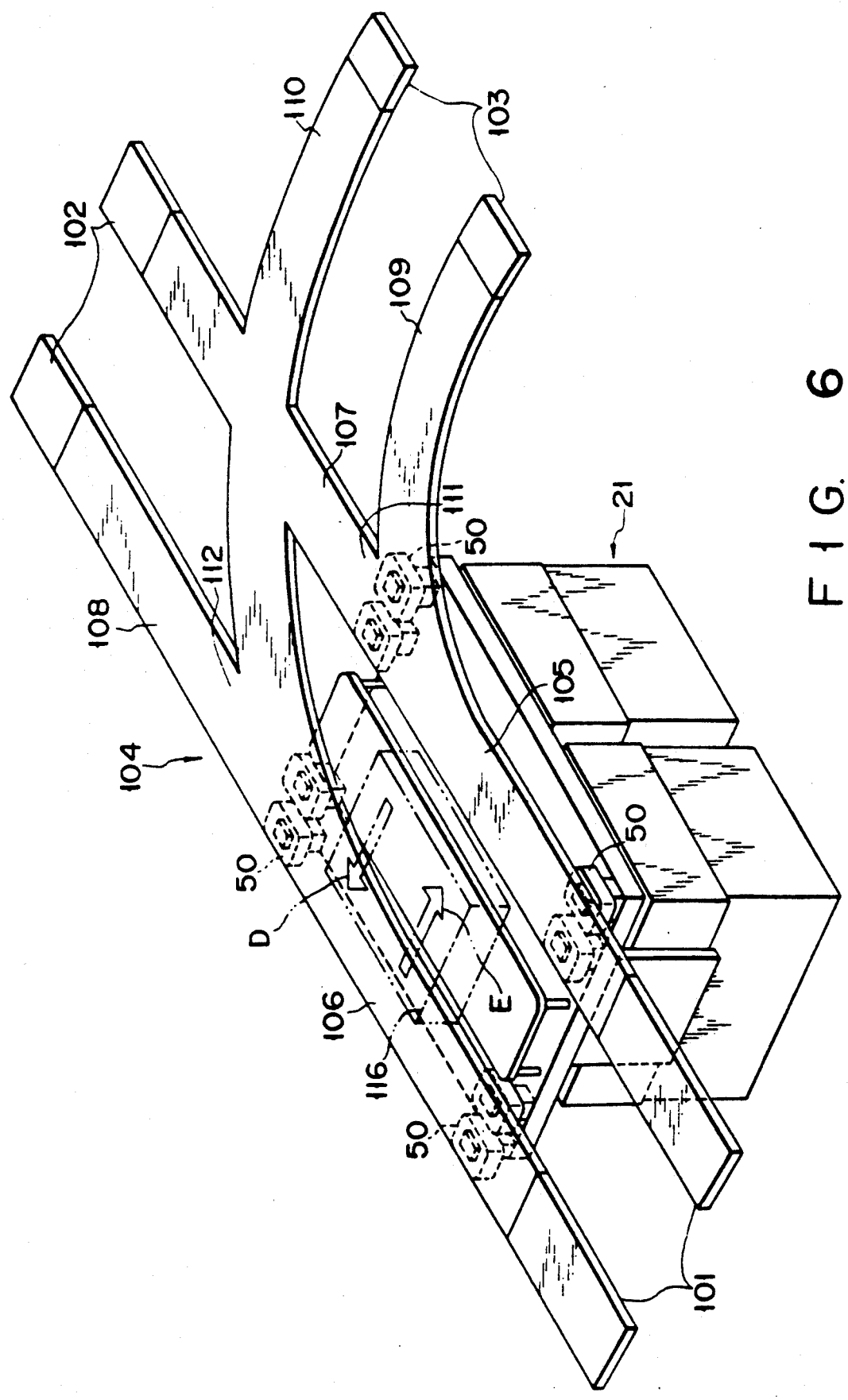
FIG. 6 is a perspective view of a fifth track unit or curved branch unit assembled in the transportation system shown in FIG. 1.

As shown in FIG. 6, guide rails of track units adjacent to branch unit 20 are defined as first rails 101, second rails 102, and third rails 103. First and second rails 101 and 102 are arranged along an identical straight line, and third rails 103 intersect first and second rails 101 and 102. The guide rails of this branch unit comprise coupling section 104 for coupling first to third rails 101 to 103. Coupling section 104 comprises first coupling rails 105 and 106, second coupling rails 107 and 108, and third coupling rails 109 and 110. One end of each of first to third coupling rails 105 to 110 is connected to corresponding one of first to third rails 101 to 103. The other end of each of first coupling rails 105 and 106 is coupled to the other end of corresponding one of second and third coupling rails 107 to 110. As a result, forked rail joining sections 111 and 112 at which these coupling rails are joined to each other are defined. Each coupling rail is formed of a ferromagnetic material. First and second coupling rails 105 to 108 are linearly formed. Third coupling rails 109 and 110 have a predetermined radius of curvature, and are formed to have a curved shape. Third coupling rails 109 and 110 intersect the first coupling rails at an obtuse angle. An interval between a pair of coupling rails is the same as that between each pair of first to third rails 101 to 103, and is also the same as that between a pair of magnetic units 50.

As shown in FIG. 6, stator 116 of the linear induction motor is mounted on support members (not shown). Stator 116 is located to face reaction plate 58 of the carrier. Stator 116 and reaction plate 58 constitute a means for transferring the carrier from one rail pair to another rail pair.

The carrier is suspended from the coupling rails in a non-contact manner by an electromagnetic attractive force between magnetic unit 50 and each coupling rail. In this case, magnetic unit 50 may be subjected to zero-power control described above.

The carrier is transferred from the first rails to second or third rails (former case), and is transferred from the second or third rails to the first rails (latter case). In the former case, the carrier coasting by receiving a predetermined propelling force from stator 40, enters from first rails 101 to first coupling rails 105 and 106. The carrier travels along the first coupling rails by the predetermined propelling force without being interfered. During travel of the carrier, when stator 116 biases reaction plate 58 in a direction indicated by arrow D, the carrier is guided from first coupling rails 105 and 106 to second coupling rails 107 and 108. Thereafter, the carrier keeps traveling by the predetermined propelling force and is guided to second rails 102. During travel of the carrier on the first coupling rails, when stator 116 biases reaction plate 58 in a direction indicated by arrow E, the carrier is guided from the first coupling rails 105 and 106 to third coupling rails 109 and 110. Thereafter, the carrier keeps traveling by the predetermined propelling force and is guided to third rails 103. Therefore, the carrier is transferred to predetermined rails while being suspended from the coupling rails in a non-contact manner without being stopped at the coupling rails.

First coupling rails 105 and 106 are arranged along the same lines as second coupling rails 107 and 108, and obliquely intersect third coupling rails 109 and 110. In the latter case, the carrier need not receive a transfer force in the direction indicated by arrow D or E, and is automatically guided from the second or third coupling rails to the first coupling rails.

However, when first to third coupling rails are formed to have a planar shape, the carrier may often fail to reliably transfer from first rails 101 to third rails 103. The reason will be explained below.

In FIG. 6, when the carrier which travels on first rails 101 reaches predetermined positions of first coupling rails 105 and 106, it receives a transfer force in a direction of third coupling rails 109 and 110. In this case, if yokes $52_1$ and $52_2$ of magnetic units 50 do not constitute magnetic circuits together with the corresponding coupling rails, no electromagnetic attractive force is generated therebetween. For this reason, yokes $52_1$ and $52_2$ must be moved along first coupling rail 105, rail joining section 111, and third coupling rail 109, as indicated by arrow F in FIG. 7. However, yokes $52_1$ and $52_2$ generate magnetic flux leakage, and magnetic resistance for magnetic unit 50 in region B1 is smallest in rail joining section 111. For this reason, when yokes $52_1$ and $52_2$ reach point A1 in FIG. 7, magnetic flux leakage is biased in region B1. As a result, a guide force for attracting yokes $52_1$ and $52_2$ and toward region B1 is generated. Thus, the transfer force for moving yokes $52_1$ and $52_2$ toward third coupling rail 109 competes with this guide force. As a result, yokes $52_1$ and $52_2$ are reciprocated along the transverse direction of the rail. When the guide force overcomes the transfer force, one yoke $52_1$ is moved to second coupling rail 107 and another yoke $52_2$ is moved to third coupling rail 109 at forked rail joining section 111. As a result, if carrier 21 keeps traveling, the magnetic circuits formed by magnetic units 50 and coupling rails are disabled. For this reason, the magnetic units may be separated from the coupling rails, and the carrier may be dropped.

In order to suppress reciprocal motion of yokes $52_1$ and $52_2$, a relatively large transfer force must be applied to the carrier. However, when yokes $52_1$ and $52_2$ are located at point A2 in FIG. 7, the amount of guide force acting on yokes $52_1$ and $52_2$ is very small. In this case, if the large transfer force is applied to the carrier, yokes $52_1$ and $52_2$ may be moved outside the coupling rail. As a result, the magnetic circuits between the magnetic units and the coupling rails may be disabled. Thus, the carrier may be dropped.

Figure 9:
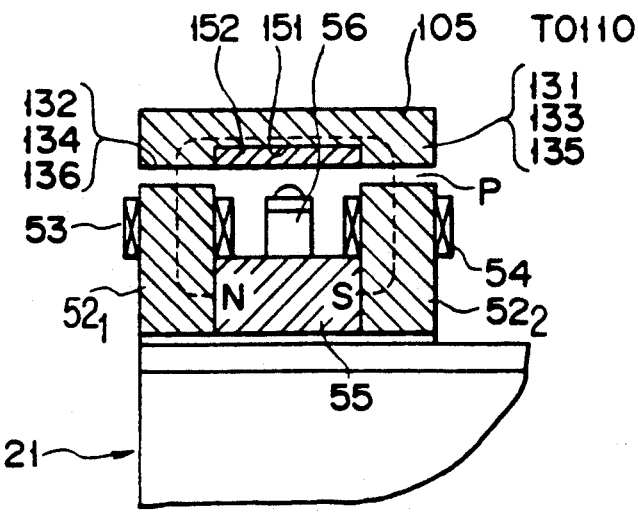
FIG. 9 is a sectional view of the coupling rail and the magnetic unit.
Figure 11:
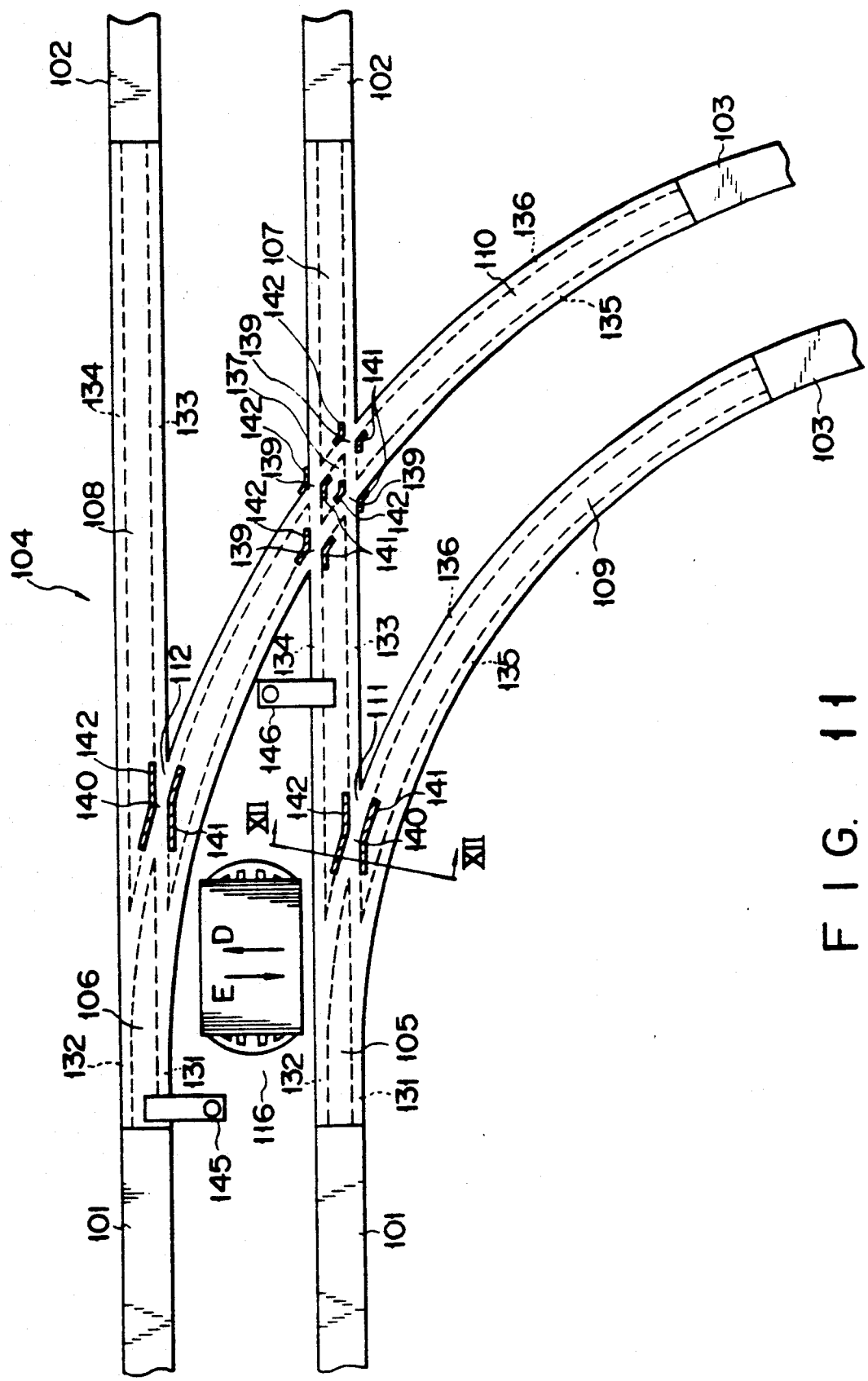
FIG. 11 is a plan view of the curved branch unit.

According to the present invention, however, as shown in FIGS. 8, 9, and 11, pairs of first and second ridges 131 to 136 are formed at two sides of each coupling rail. First and second ridges 131 and 132 are formed of a ferromagnetic material, and face yokes $52_1$ and $52_2$ of magnetic units 50. More specifically, the width of each of first and second ridges 131 to 136 is substantially the same as that of each of yokes $52_1$ and $52_2$ in the transverse direction of the coupling rail. Each ridge is integrally formed on the coupling rail.

In FIG. 8, when the carrier enters first coupling rail 105, magnetic flux leakage from yokes $52_1$ and $52_2$ is concentrated on only ridges 131 and 132, and is not biased to other portions. Thus, a force for preventing yokes $52_1$ and $52_2$ from being shifted toward the transverse direction of the rail is generated. More specifically, a magnetic resistance of region B1 shown in FIG. 8 is set to be large. For this reason, almost no magnetic flux leakage from yokes $52_1$ and $52_2$ is flowed in region B1, and almost no guide force for attracting yokes $52_1$ and $52_2$ toward region B1 is generated. Therefore, yokes $52_1$ and $52_2$ are moved from the first coupling rail to the third coupling rail along ridges 131 and 132, and are not swung in the transverse direction of the rail. For this reason, the magnetic circuits formed by magnetic units 50 and the coupling rails are not disabled at forked rail joining section 111. The carrier can be reliably transferred from first rails 101 to second rails 103.

When the relatively large transfer force is applied to the carrier, since a force for preventing yokes $52_1$ and $52_2$ from being shifted in the transverse direction of the rail is applied, yokes $52_1$ and $52_2$ can no longer be moved outside the coupling rail. Therefore, the magnetic circuits between magnetic units 50 and the coupling rail cannot be disturbed and hence, the carrier cannot be dropped.

Therefore, the carrier can be transferred from one line to another line without being stopped at the branch unit. For this reason, fifth track unit or curved branch unit 20 has a shorter transfer time than third track unit or rotary branch unit 18, and the like. A time required until the carrier reaches the destination can be shortened.

The carrier is transferred in a non-contact manner from the coupling rail. Therefore, no noise is generated. Furthermore, since the transfer means comprises the linear induction motor, the branch unit can be rendered compact. Therefore, a large number of branch units can be provided in a small space in a factory. Traffic control of a large number of carriers can be allowed, and a travel time of each carrier can be shortened.

Figure 12:
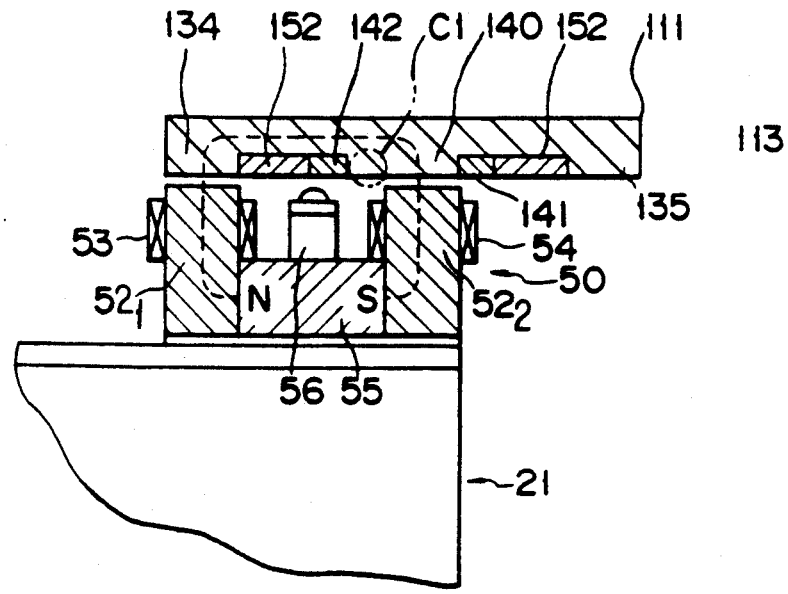
Figure 13:
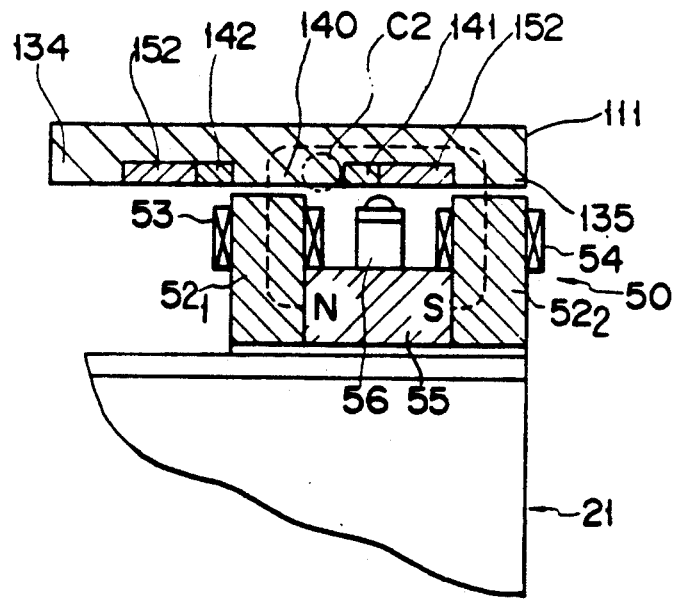

As shown in FIG. 11, ridge intersection 140 at which first ridge 133 of the first coupling rail and second ridge 136 of the third coupling rail intersect each other is formed at each of rail joining sections 111 and 112. FIGS. 12 and 13 show the section of ridge intersection 140. FIG. 12 shows a case wherein magnetic unit 50 is moved toward second coupling rails 107 and 108. FIG. 13 shows a case wherein magnetic unit 50 is moved toward third coupling rails 109 and 110. At ridge intersection 140, two ridges 133 and 136 intersect each other. Thus, the width of ridge intersection 140 is larger than that of yokes $52_1$ and $52_2$. In FIG. 12, ridge intersection 140 has region C1 which does not face yoke $52_2$. Since the magnetic resistance of region C1 is smaller than the opposite side of ridge intersection 140 region C1, magnetic flux leakage from yoke $52_2$ is flowed in region C1. For this reason, a force for attracting yoke $52_2$ toward region C1 is applied to yoke $52_2$. As a result, yoke $52_2$ is swung.

According to the present invention, ferromagnetic projection 141 is provided to the side surface of each ridge intersection 140. Thus, yoke. $52_2$ receives attractive forces from both region C1 and projection 141. Since the two attractive forces are balanced, yoke $52_2$ can be prevented from being attracted toward only region C1. As a result, swinging motion of yoke $52_2$ can be prevented.

As shown in FIG. 13, when magnetic unit 50 is moved toward third coupling rails 109 and 110, ridge intersection 140 has region C2 which does not face yoke $52_1$. Ferromagnetic projection 142 is provided to the side surface of ridge intersection 140. Thus, yoke $52_1$ can be prevented from being attracted toward region C2, and can also be prevented from being swung. Projection 141 and 142 may be integrally formed on the ridge intersection.

As shown in FIG. 11, coupling section 104 has rail intersection 137 at which one second coupling rail 107 and one third coupling rail 110 intersect each other. Rail intersection 137 has a plurality of ridge intersections 139 at which first and second ridges 133 and 134 of second coupling rail 107 and first and second ridges 135 and 136 of third coupling rail 110 intersect each other. Projections 141 and 142 are provided to the side surface of ridge intersection 139. Thus, yokes $52_1$ and $52_2$ can be prevented from being attracted toward region C1 and C2, and can also be prevented from being swung.

A control apparatus of branch unit 20 will be described hereinafter.

As shown in FIG. 11, photo sensor 145 is provided at an end portion of first coupling rail 106 near first rail 101. Photo sensor 146 is provided to an end portion of second coupling rail 107 near rail joining section 111. These photosensors 145 and 146 emit light toward reaction plate 58 of the carrier, and detect light reflected by plate 58. Sensor 145 detects whether or not the carrier enters first coupling rails 105 and 106, and generates a detection signal. More specifically, sensor 145 detects a timing when transfer of the carrier from first rails 101 to second or third rails 102 or 103 is started. Sensor 146 detects whether nor not the carrier enters second and third coupling rails 107 to 109, and generates a detection signal. More specifically, sensor 146 detects a timing when transfer of the carrier from first rails 101 to second or third rails 102 or 103 is finished.

Figure 10:
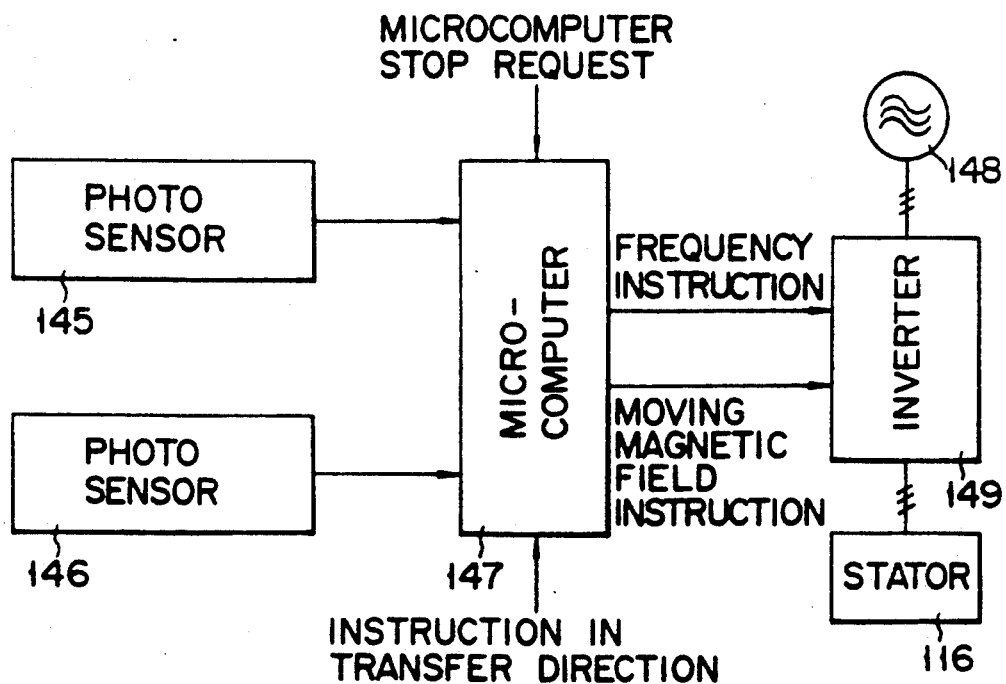
FIG. 10 is a view showing an arrangement of a control apparatus in the curved branch unit.

As shown in FIG. 10, three-phase AC power source 148 is connected to stator 116 through inverter 149. The detection signals from sensors 145 and 146 are supplied to microcomputer 147. Microcomputer 147 also receives an instruction, supplied from an external apparatus e.g., linear motor controller 45, for transferring the carrier to a predetermined rail, and an instruction for stopping microcomputer 147. Microcomputer 147 determines the output frequency of inverter 149 and a propagating direction of a moving magnetic field generated in stator 116 based on these signals and instructions.

Note that as shown in FIG. 9, magnetic unit 50 comprises gap sensor 56 for detecting gap P between yokes 53 and 54 and the guide rail. However, grooves 151 are formed in coupling rails 105 to 110 between pairs of ridges 131 to 136. For this reason, gap sensor 56 cannot accurately detect the gap between ridges 131 to 136 and yokes 51 and $52_2$. For this reason, non-magnetic member 152 is stored in each groove 151. The top face of non-magnetic member 152 is located on the identical plane to the top face of the ridge. Therefore, gap sensor 56 emits light toward the top face of non-magnetic member 152, and detects light reflected by the top face.

The operation of the branch unit will be described with reference to FIGS. 14 to 17B.

Figure 17A:
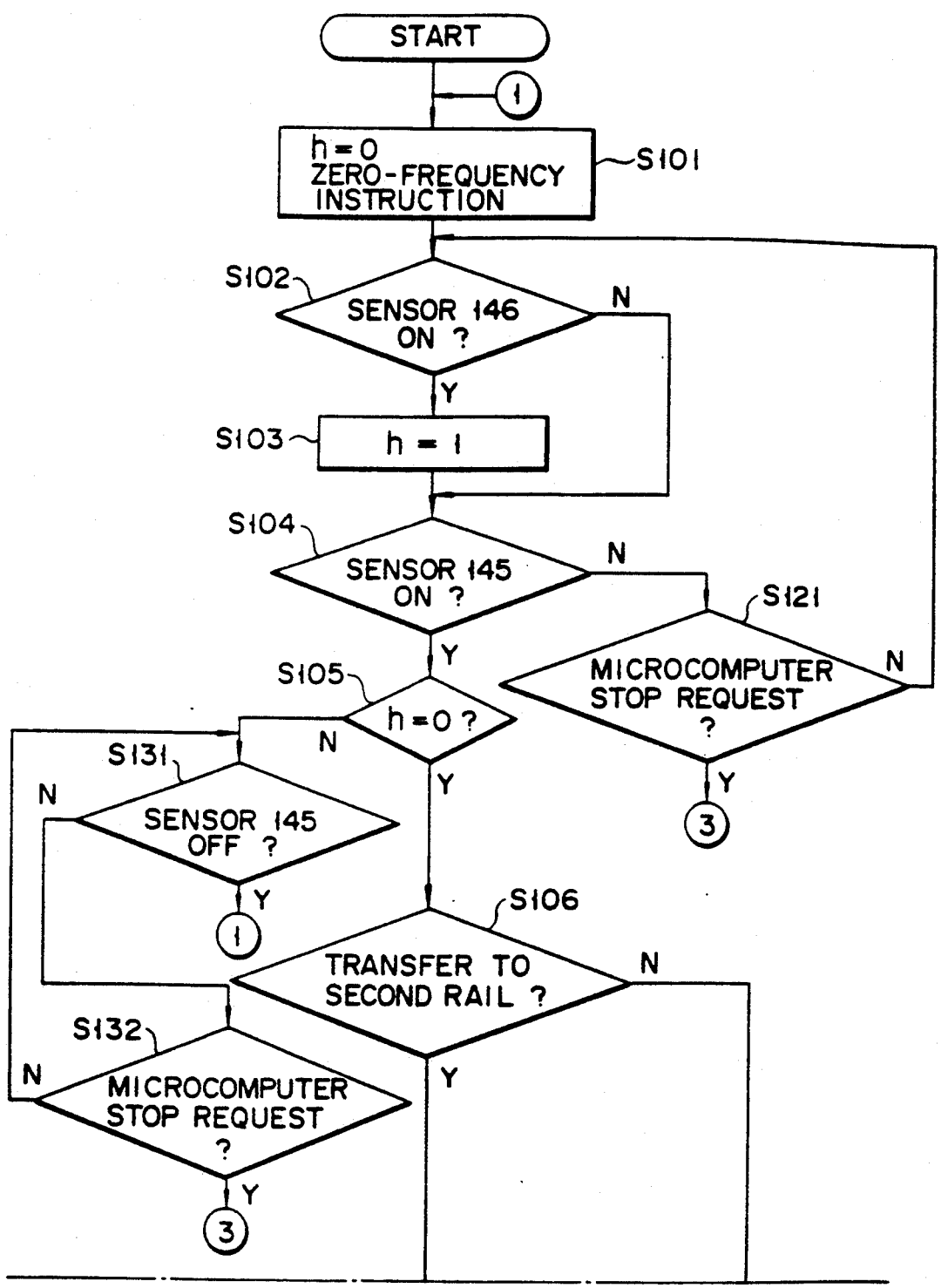
FIGS. 17A and 17B are flow charts of the control apparatus in the curved branch unit.
Figure 17B:
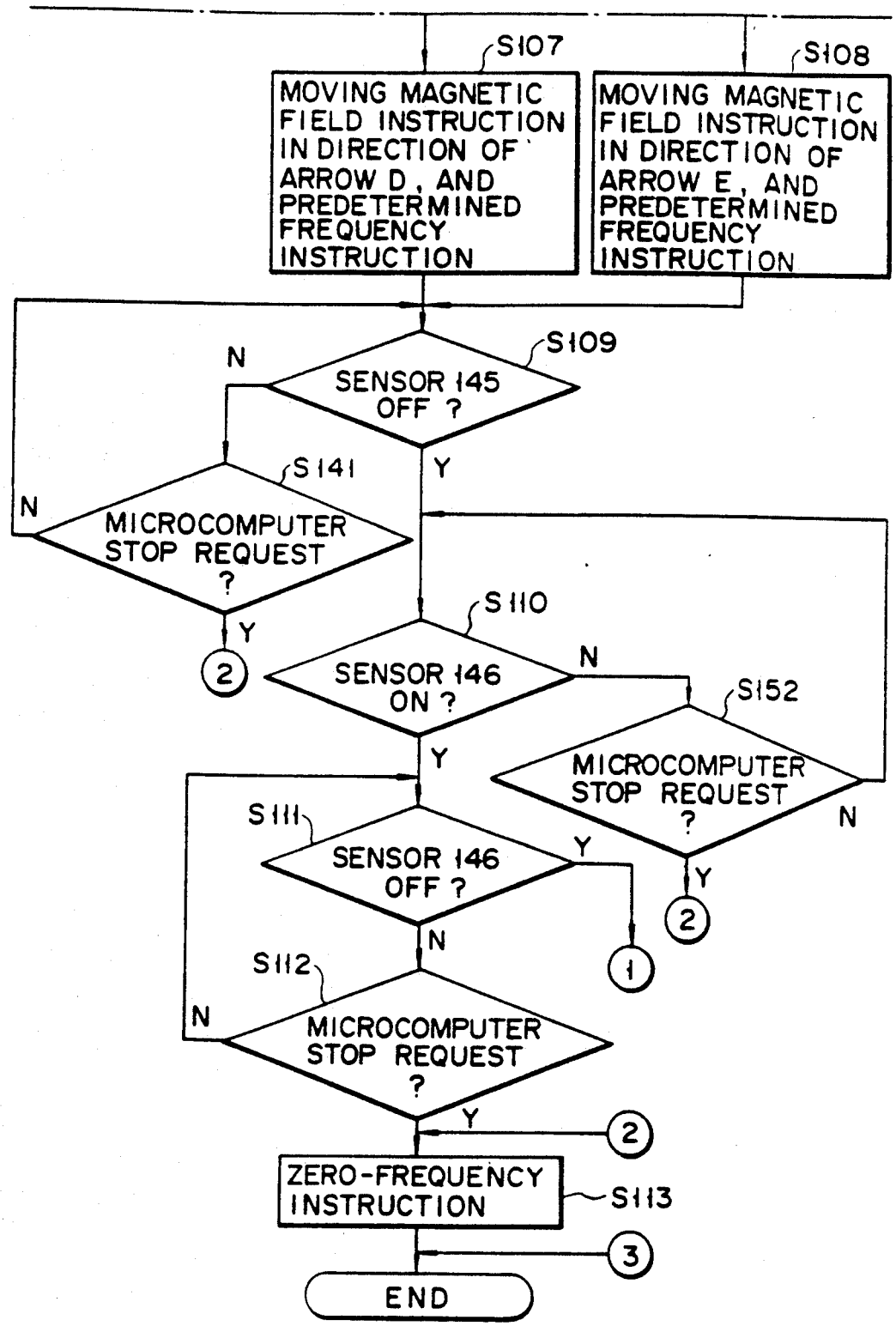

In the flow charts of FIGS. 17A and 17B, in an initial state in step 101, counter h=0. In this case, the carrier is transferred from first rails 101 to second or third rails 102 or 103. When h=1, the carrier is transferred from second or third rails 102 or 103 to first rails 101. Furthermore, in the initial state in step 101, since inverter 149 receives a zero-frequency instruction, stator 116 is not energized.

In steps 102 to 104, sensors 145 and 146 are always operated. More specifically, when the carrier is not located at coupling section 104, the flow is looped in steps 102, 104, and 121.

A case will be described wherein the carrier is transferred from first rails 101 to second or third rails 102 or 103 (i.e., h=0).

Figure 14:
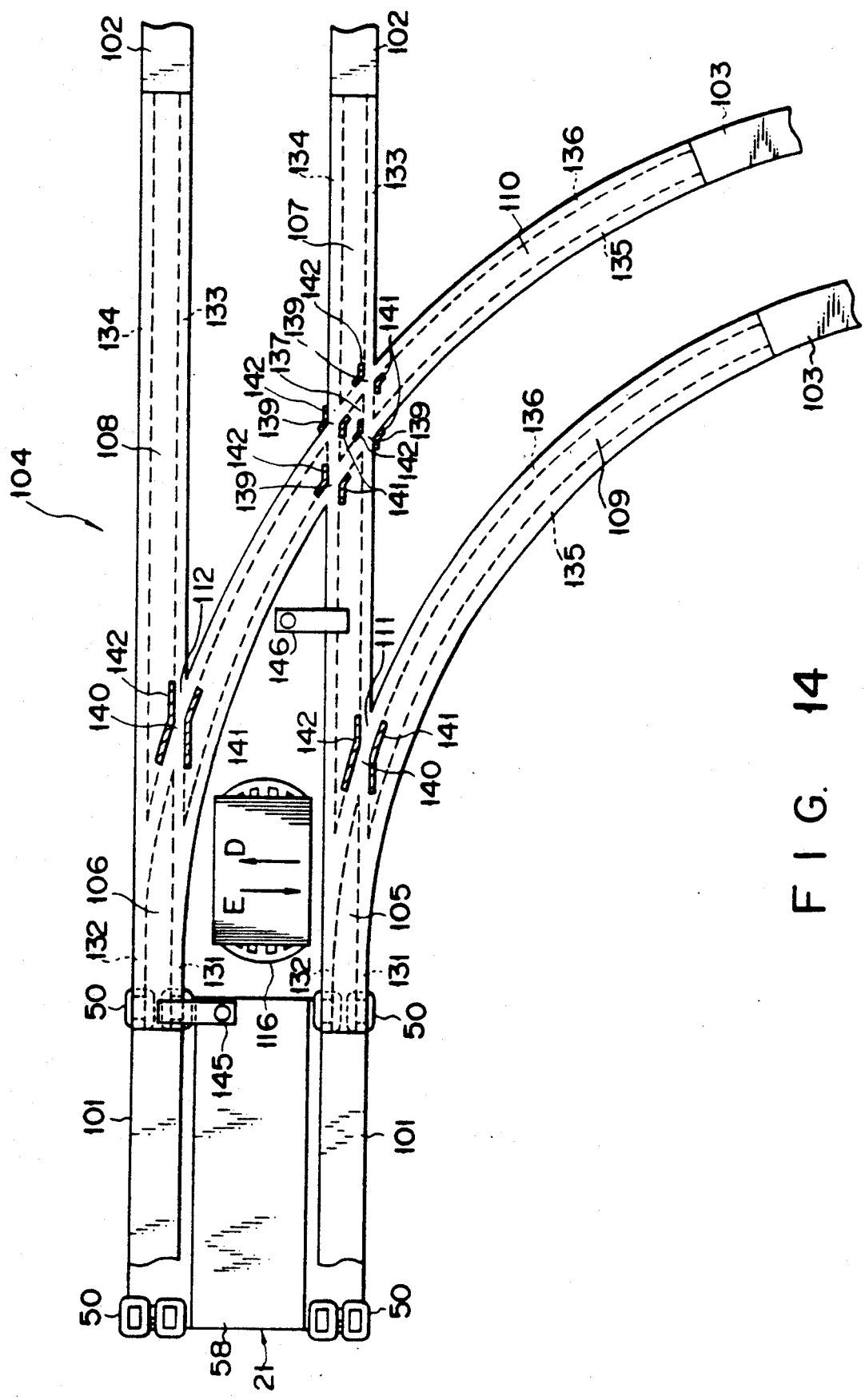
Figure 15:
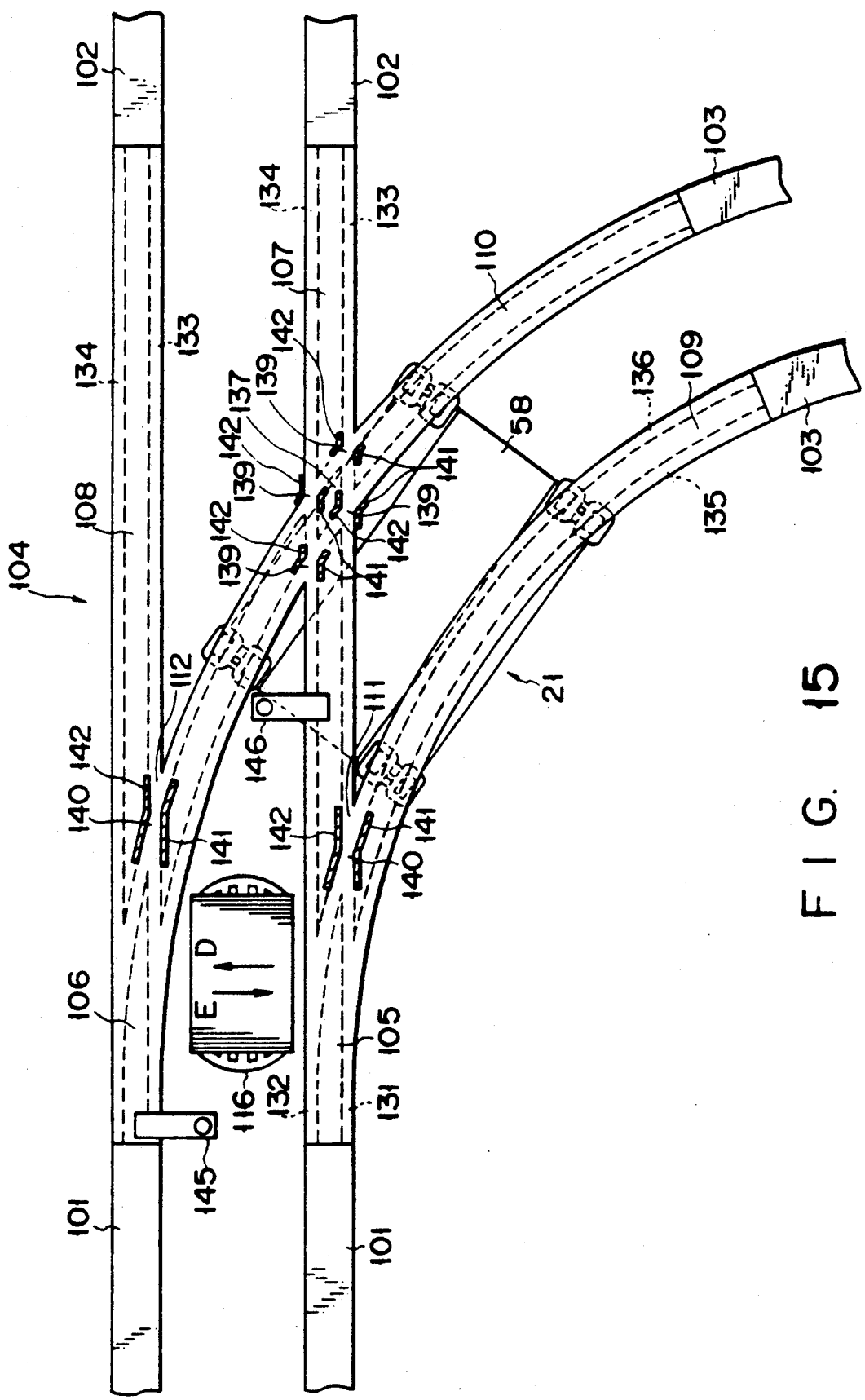
Figure 16:
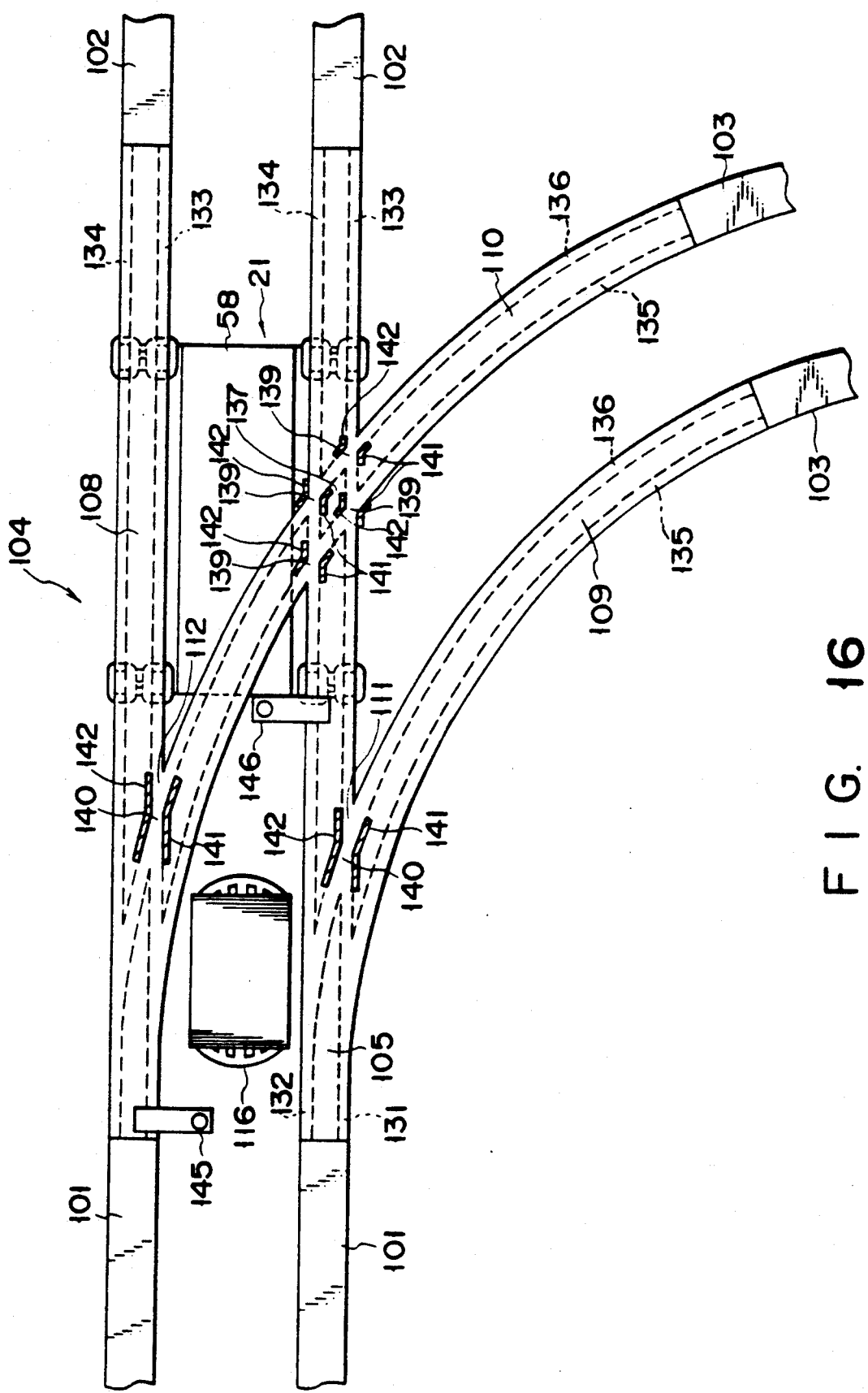

In FIG. 14, if the carrier traveles along first rails 101 and receives a predetermined propelling force, the carrier keeps traveling without being stopped at coupling rails 105 to 110. When carrier 21 reaches first coupling rails 105 and 106, sensor 145 is turned on (step 104). In step 105, h=0. It is checked in step 106 whether the carrier is transferred to second or third rails 102 or 103. If the carrier is transferred to third rails 103, inverter 149 receives an instruction of a moving magnetic field in a direction indicated by arrow E and a predetermined frequency instruction in step 108. Then, the carrier traveling along the first coupling rails receives a transfer force toward the third coupling rails, and transfer of the carrier is started. When the carrier is transferred by a predetermined distance, sensor 145 is turned off in step 109. If the carrier is further transferred by the predetermined distance, sensor 146 is turned on in step 110. Thereafter, when the carrier has reached a position shown in FIG. 15, sensor 146 is turned off in step 111. Thus, transfer of the carrier from first rails 101 to third rails 103 is ended. Flow returns to step 101, so that inverter 149 receives a zero-frequency instruction and the energization of stator 116 is stopped. The carrier keeps traveling along third rails 103. Until subsequent carrier reaches first coupling rails 105 to 110, the flow is looped in steps 102, 104, and 121.

If the carrier is transferred to second rails 102, inverter 149 receives an instruction of a moving magnetic field in a direction indicated by arrow D and a predetermined frequency instruction in step 107. Other operations are the same as those when the carrier is transferred to third rails 103. When the carrier has reached a position shown in FIG. 16, energization of stator 116 is stopped.

A case will be described wherein the carrier is transferred from second or third rails 102 or 103 to first rails 101. In this case, the carrier need not receive the transfer force from stator 116.

When the carrier enters coupling section 104 from second or third rails 102 or 103 while receiving a predetermined propelling force, sensor 146 is turned on in step 102. In step 103, counter h=1. The carrier travels along second or third coupling rails 107 and 108 or 109 and 110. When the carrier travels along first coupling rails 105 and 106 by a predetermined distance, sensor 145 is turned on in step 104. Thereafter, when the carrier travels along first rails 101, sensor 145 is turned off in step 131. Then, the flow returns to step 101. The carrier keeps traveling along first rails 101.

If a first microcomputer stop request, which is supplied to prevent stator 116 from being energized at, for instance, trial traveling, is detected in steps 121 and 132, the flow jumps to an end. If a second microcomputer stop request, which is supplied to immediately stop the energization of stator 116 in emergency, is detected in steps 112, 141 and 152, the flow advances to step 113, a zero-frequency instruction is supplied to inverter 149, and the energization of stator 116 is stopped.

As described above, a pair of ridges facing a pair of yokes are formed on each coupling rail. For this reason, magnetic flux leakage of each yoke is concentrated on only the ridge, and is not biased to other portions. Thus, a force for preventing the yoke from being shifted toward the transverse direction of the rail can be generated. The yoke is moved along the ridge, and swinging motion of the yoke can be prevented. Therefore, the magnetic circuit between the magnetic unit and the coupling rail cannot be disabled. The carrier can be reliably transferred from one line to another line, and cannot be dropped.

Therefore, the carrier can be transferred from one line to another line without being stopped at the branch unit. For this reason, fifth track unit or curved branch unit 20 has a shorter transfer time than third track unit or rotary branch unit 18. Therefore, a time required until the carrier reaches the destination can be shortened.

Moreover, the carrier is transferred in a non-contact manner, and hence, no noise is generated. Since the transfer means comprises the linear induction motor, the branch unit can be rendered compact. A large number of branch units can be provided to the track even in a small space in a factory. A large number of carriers can thus be subjected to traffic control, and a travel time of each carrier can be shortened.

In the above embodiment, each second coupling rail 102 is linearly formed. However, as shown in FIG. 18, second coupling rail 102 may be formed to have a curved shape.

Figure 19:
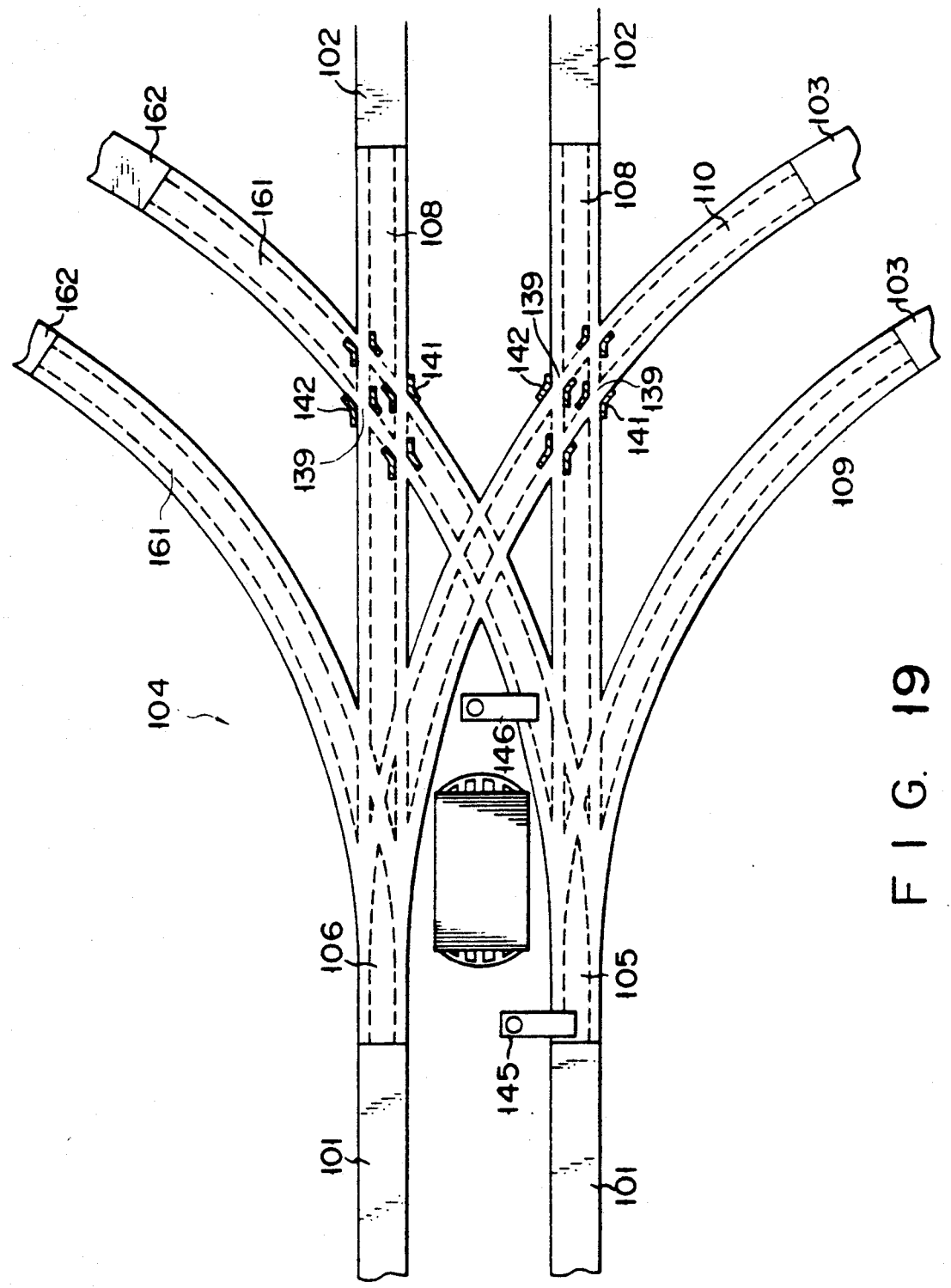
FIG. 19 is a plan view of a curved branch unit according to a second modification.

As shown in FIG. 19, coupling section 104 may be coupled to four track units. In this case, the carrier can be transferred from first rails 101 to fourth coupling rails 161 and then fourth rails 162 by the same transfer means of above embodiment.

FIG. 20 shows a modification of the coupling rail. Two grooves 170, 171 are formed on each coupling rail 105 to 110, thus defining three ridges 131 to 136, and 173. Ridges 131 to 136, together with yoke $52_1$, $52_2$, constitute magnetic circuits. Gap sensor 56 emits light toward the top face of ridge 173, so that the gap clearance between ridges 131 to 136 and yokes $52_1$ and $52_2$ is measured. In this modification, manufacture of the coupling rail may be facilitated and non-magnetic member 152 may be omitted.

Figure 21:
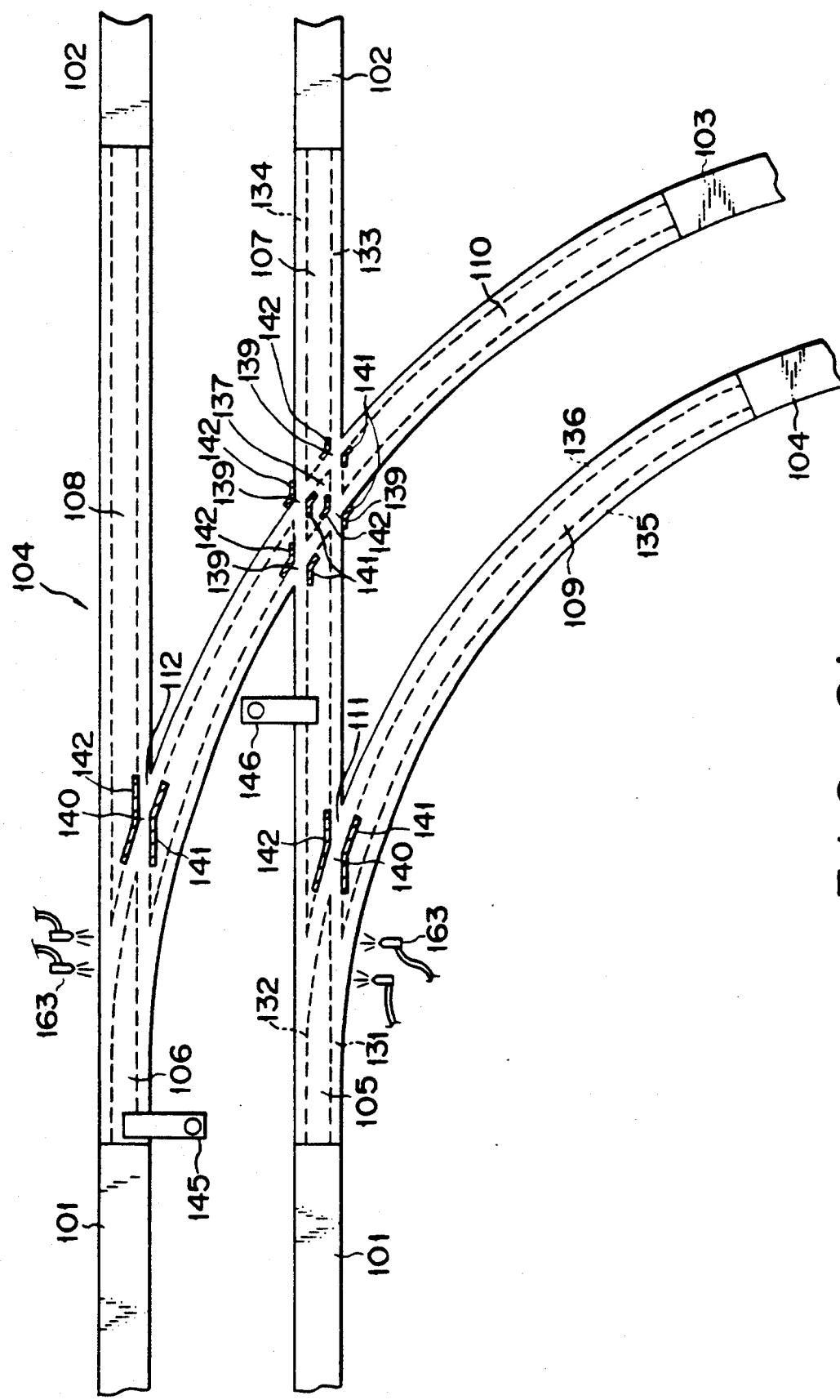
FIG. 21 is a plan view of a curved branch unit according to a fourth modification.

The branch unit may alternatively be designed so as to transfer carrier 21 by utilizing air pressure. As is shown in FIG. 21, for example, air nozzles 163 may be arranged so that they can blow air against carrier 21, thereby transferring the carrier from first coupling rail to second or third coupling rail.

Furthermore, the number of yokes is not limited to two but may be three or more. If three or more yokes are arranged, each coupling rail need only have ridges corresponding in number to the yokes.

According to the aforementioned embodiment, moreover, the guide rail includes a pair of guide rails. Alternatively, however, the guide rail used may be one, or three, or more, in number. Also, the magnetic unit may be constructed so that the carrier is caused to float by means of the magnetic force of the coils only, without using the permanent magnet.

What is claimed is:

1. A transportation system of a floated carrier type for transporting a cargo between predetermined positions, comprising:
a plurality of track units, each of said track units being assembled with adjacent track units, each of said track units including a guide rail formed of a ferromagnetic material, each guide rail having end portions connected to end portions of the guide rails of adjacent track units a carrier for running along said track units, said carrier carrying the cargo, and including a magnetic unit for suspending said carrier from said guide rail in a non-contact manner, said magnetic unit including an electromagnet arranged to have an air gap with respect to said guide rail, and a permanent magnet magnetically coupled to said electromagnet, said guide rail, said air gap, said electromagnet, and said permanent magnet providing magnetic energy, with which said carrier can be kept suspended against the weight thereof and the cargo thereon, said electromagnetic adapted to be excited so as to maintain a gap clearance, at which the magnetic attractive force acting between said permanent magnet and said guide rail balances with the total weight of said carrier itself and the load, regardless of weight of the cargo;

a traffic controller which generates a control signal for controlling said carrier;

an electrical power source which generates electrical power;

each of said track units further including:

propelling means which receives the electrical power from said electrical power source and provides a propelling force to said carrier so as to cause said carrier to travel along the guide rails of said track units, a first sensor for detecting whether said carrier passes a predetermined position and emitting a detection signal, a second sensor for detecting a speed when said carrier passes the predetermined position and emitting a detection signal, a propelling means controller which receives the control signal from said traffic controller and the detection signals from the first and second sensors, and controls the propelling means based on the signals, with the result that running of the carrier is controlled by controlling propelling force, power lines means for transmitting the electrical power supplied from said electrical power source to the propelling means, said power line means having both end portions, signal line means for transmitting the control signal supplied from said traffic controller to the propelling means controller, said signal line means having both end portions, and a pair of connectors, each of said connectors being connected to said end portions of said power line means and said signal line means, and being assembled with connectors of the adjacent track units;

wherein one of at least two track units includes a pair of first guide rails and the other of said at least two track units includes a pair of second guide rails intersecting the pari of first guide rails;

further comprising another track unit including:

a coupling section connecting the first pair of guide rails and the second pair of guide rails, and transfer means provided at the coupling section and adapted so that, at the coupling section, the carrier, having so far been running along the first pair of guide rails, is stopped, then rotated, then stopped from rotating when the carrier faces the second pair of guide rails, and then transferred from the coupling second to the second pair of guide rails, all in a non-contact manner.

2. A transportation system of a floated-carrier type for transporting a cargo between predetermined positions, comprising:

a plurality of track units, each of said track units being assembled with adjacent track units, each of said track units including a guide rail formed of a ferromagnetic material, each guide rail having end portions connected to end portions of the guide rails of adjacent track units;

plural carriers for running said track units and carrying the cargo, each carrier including a magnetic unit for suspending said carrier from said guide rail in a non-contact manner, said magnetic unit including an electromagnet arranged to have an air gap with respect to said guide rail, and a permanent magnet magnetically coupled so said electromagnet, said guide rail, said air gap, said electromagnet and said permanent magnet providing magnetic energy, with which said carrier can be kept suspending against the weight thereof and the cargo thereon, said electromagnetic adapted to be excited so as to maintain a gap clearance, at which the magnetic attractive force acting between said permanent magnet and said guide rail balances with the total weight of said carrier itself and the load, regardless of weight of the cargo;

a traffic controller which generates a control signal for controlling said carriers, said traffic controller comprising, a plurality of local controllers, each performing a traffic control of the carriers at each of the track units, and a supervisory controller for controlling the local controllers to manage and monitor the overall transportation system so that the carriers at the respective track units are distributed at an optimum timing to perform the transportation job;

an electrical power source which generates electrical power;

each of said track units further including:

propelling means which receives the electrical power from said electrical power source and provides a propelling force to said carrier so as to cause said carrier to travel along the guide rails of said track units, a first sensor for detecting whether said carrier passes a predetermined position and emitting a detection signal, a second sensor for detecting a speed when said carrier passes the predetermined position and emitting a detection signal, a propelling means controller which receives the control signal from said traffic controller and the detection signals from the first and second sensors, and controls the propelling means based on the signals, with the result that running of the carrier is controlled by controlling propelling force, power line means for transmitting the electrical power supplied from said electrical power source to the propelling means, said power line means having both end portions, signal line means for transmitting the control signal supplied from said traffic controller to the propelling means controller, said signal line means having both end portions; and a pair of connectors, each of said connectors being connected to said end portions of said power line means and said signal line means, and being assembled with connectors of the adjacent track units; and a station which includes:

a loader for loading and unloading a cargo onto and from said carrier, and a lifter for lifting the cargo between said loader and a predetermined position;

wherein said guide rail is formed to have a linear shape and one of at least two track units includes a pair of first guide rails, and the other of said at least two track units includes a pair of second guide rails intersecting the pair of first guide rails; and which includes another track unit including:

a coupling section connecting the first and second pairs of guide rails, and transfer means provided at the coupling section, and adapted so that, at the coupling section, the carrier, having so far been running along the first pair of guide rails, is stopped, and is then transferred from the coupling section to the second pair of guide rails, all in a non-contact manner, said second pair of guide rails extending by a distance larger than a transverse width of said carrier, and said station being located at an end portion of said second pair of guide rails.

3. A transportation system of a floated-carrier type for transporting a cargo between predetermined positions, comprising:

a plurality of track units, each of said track units being assembled with adjacent track units, each of said track units including a guide rail formed of a ferromagnetic material, each guide rail having end portions connected to end portions of the guide rails of adjacent track units;

a plurality of carriers of different types for running along said track units, said carrier carrying the cargo, and including a magnetic unit for suspending said carrier from said guide rail in a non-contact manner, said magnetic unit including an electromagnet arranged to have an air gap with respect to said guide rail, and a permanent magnet magnetically coupled to said electromagnet, said guide rail, said air gap, said electromagnet, and said permanent magnet providing magnetic energy, with which said carrier can be kept suspending against the weight thereof and the cargo thereon, said electromagnetic adapted to be excited so as to maintain a gap clearance, at which the magnetic attractive force acting between said permanent magnet and said guide rails balances with the total weight of said carrier itself and the load, regardless of weight of the cargo;

a traffic controller which generates a control signal for controlling said carrier, said traffic controller comprising, a plurality of local controllers, each performing a traffic control of the carriers at each of the track units, and a supervisory controller for controlling the local controllers to manage and monitor the overall transportation system so that the carriers at the respective track units are distributed at an optimum timing to perform the transportation job;

an electrical power source which generates electrical power;

each of said track units further including:

propelling means including a stator which receives the electrical power from said electrical power source and provides a propelling force to said carrier so as to cause said carrier to travel along the guide rails of said track units, a first sensor for detecting whether said carrier passes a predetermined position and emitting a detection signal, a second sensor for detecting a speed when said carrier passes the predetermined position and emitting a detection signal, a third sensor for identifying a type of each carrier, a propelling means controller which receives the control signal from said traffic controller and the detection signals from the first, second and third sensors, and controls the propelling means based on the signals, with the result that running of the carrier is controlled by controlling propelling force, power line means for transmitting the electrical power supplied from said electrical power source to the propelling means, said power line means having both end portions, signal line means for transmitting the control signal supplied from said traffic controller to the propelling means controller, said signal line means having both end portions, a pair of connectors, each of said connectors being connected to said end portions of said power line means and said signal line means, and being assembled with connectors of the adjacent track units, an invertor for supplying three-phase AC power to said stator, an inverter controller for controlling said inverter based on detection signals from said first and second sensors, and said electrical wire includes a wire, connected to said inverter, for supplying power, and a wire, connected to said first and third sensors, for transmitting the signal;

wherein said guide rail is formed to have a linear shape and one of at least two track units includes a pair of first guide rails, and the other of said at least two track units includes a pair of second guide rails intersecting the pair of first guide rails; and which includes another track unit including:

a coupling section connecting the first and second pairs of guide rails, and transfer means provided at the coupling section, and adapted so that, at the coupling section, the carrier, having so far been running along the first pair of guide rails, is stopped, and is then transferred from the coupling section to the second pair of guide rails, all in a non-contact manner, said second pair of guide rails extending by a distance larger than a transverse width of said carrier, and said station being located at an end portion of said second pair of guide rails.

4. A transportation system according to any of claims 1, 2, or 3, wherein said propelling means includes a stator for a linear induction motor arranged in each of said track units, and a reaction plate for the linear induction motor arranged on said carrier and receiving a propelling force from said stator.

5. A transportation system according to any of claims 1, 2, or 3, wherein said guide rail is formed to have a linear shape.

6. A transportation system according to any of claims 1, 2, or 3, wherein said guide rail is formed to have a curved shape.

7. A transportation system according to any of claims 1, 2, or 3, further comprising a charging power source, wherein said carrier has a battery for supplying electrical power to said magnetic unit, and a first terminal connected to said battery, and each of said track units has a second terminal connected to said charging power source, whereby, when the carrier is stopped at a predetermined position, the first and second terminals are brought into contact with each other, and said charging power source supplies.

8. A transportation system according to claim 1, further comprising:
a supervisory controller which manages and monitors the overall transportation system and distributes the carriers in an optimum timing and sequence to perform the transportation job; and
a local controller for performing traffic control of the carriers located at a plurality of track units.

9. A transportation system according to any of claims 1, 2, or 3, further comprising:
an electrical power source for supplying power to said transportation system; and
an auxiliary electrical power source for supplying power to said transportation system without interrupting supply of power to said transportation system when said electrical power source is malfunctioned.

* * * * *